(12) United States Patent
Kendrick et al.

(10) Patent No.: US 7,575,724 B2
(45) Date of Patent: *Aug. 18, 2009

(54) CONTINUOUS SLURRY POLYMERIZATION APPARATUS

(75) Inventors: James Austin Kendrick, Baton Rouge, LA (US); Thomas W. Towles, Baton Rouge, LA (US); Scott Thomas Roger, Baton Rouge, LA (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 11/832,156

(22) Filed: Aug. 1, 2007

(65) Prior Publication Data

US 2007/0274873 A1 Nov. 29, 2007

Related U.S. Application Data

(60) Division of application No. 10/085,809, filed on Feb. 28, 2002, now Pat. No. 7,268,194, which is a continuation-in-part of application No. 10/079,226, filed on Feb. 19, 2002, now Pat. No. 6,833,415, which is a continuation-in-part of application No. 09/955,729, filed on Sep. 19, 2001, which is a division of application No. 09/679,959, filed on Oct. 5, 2000, now Pat. No. 6,319,997, which is a division of application No. 09/313,818, filed on May 18, 1999, now Pat. No. 6,204,344, which is a continuation-in-part of application No. 09/080,412, filed on May 18, 1998, now abandoned, which is a continuation-in-part of application No. 09/081,392, filed on May 18, 1998, now Pat. No. 6,281,300.

(60) Provisional application No. 60/078,859, filed on Mar. 20, 1998.

(51) Int. Cl.
*C08F 2/00* (2006.01)
*B01J 19/18* (2006.01)

(52) U.S. Cl. .................. 422/132; 422/134; 526/64; 528/501

(58) Field of Classification Search ............... 422/130, 422/131, 132, 134; 528/501; 526/64
See application file for complete search history.

(56) References Cited

U.S. PATENT DOCUMENTS 1,693,786 A  12/1928  Isaachsen (Continued)

FOREIGN PATENT DOCUMENTS

CA  857386  12/1970

(Continued)

OTHER PUBLICATIONS

U.S. Appl. No. 09/080,412, filed May 18, 1998, Kendrick.

(Continued)

*Primary Examiner*—N. Bhat

(57) ABSTRACT

A process/apparatus is disclosed for continuously separating a liquid medium comprising diluent and unreacted monomers from a polymerization effluent comprising diluent, unreacted monomers and polymer solids, comprising a continuous discharge of the polymerization effluent from a slurry reactor through a discharge valve and transfer conduit into a first intermediate pressure flash tank with a conical bottom defined by substantially straight sides inclined at an angle to that of horizontal equal to or greater than the angle of slide of the slurry/polymer solids and an exit seal chamber of such diameter (d) and length (l) as to maintain a desired volume of concentrated polymer solids/slurry in the exit seal chamber such as to form a pressure seal while continuously discharging a plug flow of concentrated polymer solids/slurry bottom product of the first flash tank from the exit seal chamber through a seal chamber exit reducer with inclined sides defined by substantially straight sides inclined at an angle to that of horizontal equal to or greater than the angle of slide of the polymer solids which remain after removal of about 50 to 100% of the inert diluent therefrom to a second flash tank at a lower pressure.

9 Claims, 6 Drawing Sheets

U.S. PATENT DOCUMENTS

| | | | |
|---|---|---|---|
| 2,825,721 | A | 3/1958 | Hogan et al. |
| 2,915,513 | A | 12/1959 | Leatherman et al. |
| 2,988,527 | A | 6/1961 | Tegge |
| 3,152,872 | A | 10/1964 | Scoggin et al. |
| 3,172,737 | A | 3/1965 | Whittington |
| 3,203,766 | A | 8/1965 | Mudd et al. |
| 3,242,150 | A | 3/1966 | Scoggin |
| 3,248,179 | A | 4/1966 | Norwood |
| 3,257,363 | A | 6/1966 | Miller et al. |
| 3,262,922 | A | 7/1966 | Payne |
| 3,293,000 | A | 12/1966 | Marwil |
| 3,318,857 | A | 5/1967 | Dietz |
| 3,324,093 | A | 6/1967 | Alleman |
| 3,418,305 | A | 12/1968 | Payne et al. |
| 3,551,403 | A | 12/1970 | Delbouille et al. |
| 3,625,658 | A | 12/1971 | Closon |
| 3,640,980 | A | 2/1972 | Baba |
| 3,794,627 | A | 2/1974 | Giachetto |
| 3,816,383 | A | 6/1974 | Stotko |
| 3,858,943 | A | 1/1975 | Bose et al. |
| 3,956,061 | A | 5/1976 | Young et al. |
| 3,956,257 | A | 5/1976 | Hogan |
| 4,007,321 | A | 2/1977 | Scholz et al. |
| 4,099,335 | A | 7/1978 | Jezl et al. |
| 4,121,029 | A | 10/1978 | Irvin et al. |
| 4,199,546 | A | 4/1980 | Kirch |
| 4,372,758 | A | 2/1983 | Bobst et al. |
| 4,383,972 | A | 5/1983 | McCurdy et al. |
| 4,395,523 | A | 7/1983 | Kirch |
| 4,424,341 | A * | 1/1984 | Hanson et al. ............. 528/501 |
| 4,436,902 | A | 3/1984 | Wood et al. |
| 4,439,601 | A | 3/1984 | McCurdy et al. |
| 4,461,889 | A | 7/1984 | Hanson |
| 4,501,885 | A | 2/1985 | Sherk et al. |
| 4,589,957 | A | 5/1986 | Sherk et al. |
| 4,596,862 | A | 6/1986 | McDaniel et al. |
| 4,613,484 | A | 9/1986 | Ayres et al. |
| 4,632,976 | A | 12/1986 | Asanuma et al. |
| 4,690,804 | A | 9/1987 | Rohlfing |
| 4,713,444 | A | 12/1987 | Matsuyama et al. |
| 4,737,280 | A | 4/1988 | Hanson |
| 4,794,151 | A | 12/1988 | Mueller-Mall et al. |
| 4,832,915 | A | 5/1989 | Messura et al. |
| 5,183,866 | A | 2/1993 | Hottovy |
| 5,207,929 | A | 5/1993 | Sung et al. |
| 5,276,115 | A | 1/1994 | Bohmer et al. |
| 5,292,863 | A | 3/1994 | Wang |
| 5,314,579 | A | 5/1994 | Sung |
| 5,326,835 | A | 7/1994 | Ahvenainen et al. |
| 5,387,659 | A | 2/1995 | Hottovy et al. |
| 5,391,656 | A | 2/1995 | Campbell et al. |
| 5,416,179 | A | 5/1995 | Welch et al. |
| 5,436,212 | A | 7/1995 | Geerts |
| 5,455,314 | A | 10/1995 | Burns et al. |
| 5,473,020 | A | 12/1995 | Peifer et al. |
| 5,480,948 | A | 1/1996 | Geerts |
| 5,492,985 | A | 2/1996 | Peifer et al. |
| 5,565,174 | A * | 10/1996 | Burns et al. ................. 422/131 |
| 5,565,175 | A * | 10/1996 | Hottovy et al. ............. 422/132 |
| 5,575,979 | A | 11/1996 | Hanson |
| 5,597,892 | A | 1/1997 | Hanson |
| 5,639,834 | A | 6/1997 | Debras et al. |
| 5,712,365 | A | 1/1998 | Arai et al. |
| 5,747,407 | A | 5/1998 | Martin |
| 5,986,021 | A | 11/1999 | Hokkanen et al. |
| 6,042,790 | A | 3/2000 | Hottovy et al. |
| 6,045,661 | A | 4/2000 | Kreischer et al. |
| 6,204,344 | B1 | 3/2001 | Kendrick et al. |
| 6,239,235 | B1 * | 5/2001 | Hottovy et al. ................. 526/64 |
| 6,281,300 | B1 | 8/2001 | Kendrick |
| 6,319,997 | B1 * | 11/2001 | Kendrick et al. ............. 526/64 |
| 6,380,325 | B1 | 4/2002 | Kendrick |
| 6,566,460 | B1 * | 5/2003 | Salmon ....................... 526/64 |
| 2001/0012497 | A1 | 8/2001 | Debras |

FOREIGN PATENT DOCUMENTS

| | | |
|---|---|---|
| DE | 1 800 935 | 5/1969 |
| EP | 415 427 | 3/1991 |
| EP | 416 379 | 3/1991 |
| EP | 432 555 | 6/1991 |
| EP | 0479 186 | 4/1992 |
| EP | 0 519 266 | 12/1992 |
| EP | 648 697 | 4/1995 |
| EP | 891 990 | 1/1999 |
| FI | 96216 | 2/1996 |
| GB | 841 263 | 7/1960 |
| GB | 1 435 965 | 5/1976 |
| JP | 72013367 | 4/1972 |
| JP | 62-13408 | 8/1989 |
| JP | 07-286004 | 10/1995 |
| WO | WO 96/18662 | 6/1996 |
| WO | WO 97/36942 | 10/1997 |
| WO | WO 99/47251 | 9/1999 |
| WO | WO 99/60028 | 11/1999 |
| WO | WO 00/02929 | 1/2000 |
| WO | WO 01/05842 * | 1/2001 |
| WO | WO 01/05842 A1 | 1/2001 |
| WO | WO 03/039739 | 5/2003 |
| WO | WO 03/040197 | 5/2003 |

OTHER PUBLICATIONS

U.S. Appl. No. 09/955,729, filed Sep. 19, 2001, Kendrick et al.
U.S. Appl. No. 10/023,677, filed Feb. 14, 2002, Kendrick.
U.S. Appl. No. 10/147,219, filed May 14, 2002, Kendrick.
U.S. Appl. No. 09/992,770, filed Nov. 6, 2001, Kendrick et al.
U.S. Appl. No. 09/992,590, filed Nov. 6, 2001, Kendrick et al.
U.S. Appl. No. 10/079,226, filed Feb. 19, 2002, Kendrick et al.
U.S. Appl. No. 10/375,660, filed Feb. 27, 2003, Kendrick et al.
U.S. Appl. No. 10/260,010, filed Mar. 11, 2003, Kendrick et al.
U.S. Appl. No. 10/260,011, filed Mar. 11, 2003, Kendrick et al.
Chem Systems Inc., High Density Polyethylene 91-6-51-61 (Apr. 1993) ("the Chem Systems report").
Chem Systems PERP Report, *High Density Polyethylene* 91-6, (Apr. 1993), pp. 8-11, 59-60 (New York).
Declaration of Scott Roger for Submission of Prior Art ("the Roger declaration").
Michael Arne, SRI International, High Density Polyethylene, Supplement D, A private report by the Process Economics Program, May 1989.
K.B. Bryan et al., "Polypropylene: Supplement A." *SRI International Report*, Process Economics Program, Report No. 128A, Aug. (1993).
Declaration of Scott T. Roger As Part Of Supplemental Information Disclosure Statement (proprietary material).
J.P. Hogan et al., "Phillips Petroleum Company Loop Reactor Polyethylene Technology," *Journal of Applied Polymer Science: Applied Polymer Symposium*, 36, 49-60 (1981).
R.H. Perry & C.H. Chilton (Eds.), *Chemical Engineers' Handbook* (5th ed.), McGraw-Hill, Inc., New York, New York, pp. 5-46-5-47 (1973).
"Total Quality Report", Baton Rouge, Louisiana, vol. 13, No. 1, Jan./Feb. p. 4 (1998).

* cited by examiner

CONTINUOUS SLURRY POLYMERIZATION APPARATUS

CROSS REFERENCE TO RELATED APPLICATIONS

This application is a divisional application of U.S. application Ser. No. 10/085,809, filed Feb. 28, 2002, now U.S. Pat. No. 7,268,194, which is a continuation-in-part of U.S. application Ser. No. 10/079,226, filed Feb. 19, 2002, now U.S. Pat. No. 6,833,415, which is a continuation-in-part of U.S. application Ser. No. 09/955,729, filed Sep. 19, 2001, now abandoned, which is a divisional application of U.S. application Ser. No. 09/679,959, now U.S. Pat. No. 6,319,997 filed Oct. 5, 2000, which is a divisional application of U.S. application Ser. No. 09/313,818, now U.S. Pat. No. 6,204,344, filed May 18, 1999, which is a continuation-in-part of U.S. application Ser. Nos. 09/080,412 and 09/081,392, now U.S. Pat. No. 6,281,300, both filed May 18, 1998, which both claim the benefit of U.S. Provisional Application No. 60/078,859, filed Mar. 20, 1998. Each application in this chain of priority is incorporated by reference herein in its entirety.

FIELD OF INVENTION

The present invention relates to an apparatus for continuously separating polymer solids from a liquid medium comprising an inert diluent and unreacted monomers in a slurry polymerization process. In particular, the present invention relates to an apparatus for continuously separating polymer solids from a liquid medium, drying the polymer, and recovering the diluent and unreacted monomers with a reduction in compression needed for diluent vapor condensation to liquid diluent for reuse in the polymerization process. In another aspect, the invention relates to a method for continuously separating polymer solids from a liquid medium. In particular, the invention relates to a method for continuously separating polymer solids from a liquid medium, drying the polymer, and recovering the inert diluent and unreacted monomers for reuse in the polymerization process.

The present invention also relates to a process for producing polymer in a continuous slurry loop reactor comprising feeding catalyst, monomer, and, optionally, at least one of co-monomer, co-catalyst, diluent, polymer modifier, or mixtures thereof into the reactor; wherein catalyst is fed into the reactor from multiple catalyst inlets; and recovering polymer from the reactor.

The present invention also relates to a process for producing polymer in a continuous slurry loop reactor which comprises: reacting a monomer in a hydrocarbon diluent to form a polymerization slurry of polymer solids in a liquid medium; discharging a portion of the polymerization slurry as slurry effluent which comprises a slurry of discharged polymer solids in a discharged liquid medium through at least two discharge conduits; combining the effluent from at least two of the discharge conduits; flashing the combined effluent in a first flash to form a first flash vapor and a first flash slurry; and condensing at least a portion of the first flash vapor without compression.

The present invention also relates to a slurry loop reactor which comprises: multiple catalyst inlets; at least one feed inlet; at least one discharge conduit; and at least one circulator in the reactor; wherein the catalyst inlets are located within 45% of the points of symmetry of the loop reactor.

The present invention also relates to a loop reactor that comprises at least 8 vertical legs; at least two discharge conduits located on opposite sides of at least one loop reactor vertical plane of symmetry; and at least two feed inlets located on opposite sides of at least one loop reactor vertical plane of symmetry.

The present invention also relates to a process of converting a loop reactor into multiple loop reactors which comprises starting with a loop reactor comprising at least 8 vertical legs; at least two non-vertical conversion runs, each non-vertical run connected in fluid flow communication with two vertical legs; at least two feed inlets; and at least two continuous discharge conduits; disconnecting at least one connection of at least two conversion runs; and reconnecting each said conversion run in fluid flow communication with a different vertical leg in such a manner to form multiple loop reactors, each having at least one feed inlet and at least one continuous discharge conduit.

BACKGROUND OF THE INVENTION

In many polymerization processes for the production of polymer, a polymerization effluent is formed which is a slurry of particulate polymer solids suspended in a liquid medium, ordinarily the reaction diluent and unreacted monomers. A typical example of such processes is disclosed in Hogan and Bank's U.S. Pat. No. 2,285,721, the disclosure of which is incorporated herein by reference. While the polymerization processes described in the Hogan document employs a catalyst comprising chromium oxide and a support, the present invention is applicable to any process producing an effluent comprising a slurry of particulate polymer solids suspended in a liquid medium comprising a diluent and unreacted monomer. Such reaction processes include those which have come to be known in the art as particle form polymerizations.

In most commercial scale operations, it is desirable to separate the polymer and the liquid medium comprising an inert diluent and unreacted monomers in such a manner that the liquid medium is not exposed to contamination so that the liquid medium can be recycled to the polymerization zone with minimal if any purification. A particularly favored technique that has been used heretofore is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor wherein the pressure of the polymerization reaction is about 100 to 700 psia. The produced solid polymer is also circulated in the reactor. A slurry of polymer and the liquid medium is collected in one or more settling legs of the slurry loop reactor from which the slurry is periodically discharged to a flash chamber wherein the mixture is flashed to a low pressure such as about 20 psia. While the flashing results in substantially complete removal of the liquid medium from the polymer, it is necessary to recompress the vaporized polymerization diluent (i.e., isobutane) in order to condense the recovered diluent to a liquid form suitable for recycling as liquid diluent to the polymerization zone. The cost of compression equipment and the utilities required for its operation often amounts to a significant portion of the expense involved in producing polymer.

Some polymerization processes distill the liquified diluent prior to recycling to the reactor. The purpose of distillation is removal of monomers and light-end contaminants. The distilled liquid diluent is then passed through a treater bed to remove catalyst poisons and then on to the reactor. The equipment and utilities costs for distillation and treatment can be a significant portion of the cost of producing the polymer.

In a commercial scale operation, it is desirable to liquify the diluent vapors at minimum cost. One such technique used heretofore is disclosed in Hanson and Sherk's U.S. Pat. No. 4,424,341 in which an intermediate pressure flash step removes a significant portion of the diluent at such a temperature and at such a pressure that this flashed portion of diluent may be liquified by heat exchange instead of by a more costly compression procedure.

BRIEF SUMMARY OF THE INVENTION

The present invention relates to a process for producing polymer in a continuous slurry loop reactor comprising feeding catalyst, monomer, and, optionally, at least one of co-monomer, co-catalyst, diluent, polymer modifier, or mixtures thereof into the reactor; wherein catalyst is fed into the reactor from multiple catalyst inlets; and recovering polymer from the reactor.

In one embodiment in accordance with the present invention, the process also comprises at least one feed inlet for at least one of monomer, co-monomer, co-catalyst, diluent, polymer modifier, process additive, or mixtures thereof. Preferably, the process comprises multiple feed inlets.

In another embodiment in accordance with the invention, the process also comprises at least one circulator in the reactor. Preferably, the at least one circulator comprises a pump. Also preferably, the at least one circulator comprises a motor driven device to increase the pressure of the circulating slurry in the loop reactor.

In one embodiment in accordance with the invention, at least one of the catalyst inlets is located at the suction end of at least one circulator. In another embodiment in accordance with the present invention, at least one feed inlet is located at the discharge end of at least one circulator. Preferably, at least one catalyst inlet and at least one feed inlet are located at the suction end and discharge end, respectively, of the same circulator.

Generally, the catalyst inlets are located within 45% of the points of symmetry of the loop reactor. Preferably, the catalyst inlets are located within 25% of the points of symmetry of the loop reactor. More preferably, the catalyst inlets are located within 10% of the points of symmetry of the loop reactor. Most preferably, the catalyst inlets are located at the points of symmetry of the loop reactor.

Generally, the circulators are located within 45% of the points of symmetry of the loop reactor. Preferably, the circulators are located within 25% of the points of symmetry of the loop reactor. More preferably, the circulators are located within 10% of the points of symmetry of the loop reactor. Most preferably, the circulators are located at the points of symmetry of the loop reactor.

Also generally, the feed inlets are located within 45% of the points of symmetry of the loop reactor. Preferably, the feed inlets are located within 25% of the points of symmetry of the loop reactor. More preferably, the feed inlets are located within 10% of the points of symmetry of the loop reactor. Most preferably, the feed inlets are located at the points of symmetry of the loop reactor.

In accordance with another embodiment in accordance with the present invention, the loop reactor has a length of at least 750 feet, preferably at least 1,000 feet, and more preferably at least 1,400 feet. In yet another embodiment in accordance with the present invention, the loop reactor has at least 6 legs, preferably at least 8 legs, and more preferably at least 12 legs. In yet another embodiment in accordance with the present invention, the loop reactor has a volume of at least 10,000 gallons, preferably at least 20,000 gallons, more preferably at least 35,000 gallons, and most preferably at least 40,000 gallons.

In one embodiment in accordance with the present invention, the difference of the reactant monomer concentrations, measured in wt. %, taken at any two points along the loop reactor, is within 20% of the higher value. In a preferred embodiment, the difference of the reactant monomer concentrations, measured in wt. %, taken at any two points along the loop reactor, is within 10% of the higher value. In yet a more preferred embodiment, the difference of the reactant monomer concentrations, measured in wt. %, taken at any two points along the loop reactor, is within 5% of the higher value.

The present invention also relates to a process for producing polymer in a continuous slurry loop reactor which comprises: reacting a monomer in a hydrocarbon diluent to form a polymerization slurry of polymer solids in a liquid medium; discharging a portion of the polymerization slurry as slurry effluent which comprises a slurry of discharged polymer solids in a discharged liquid medium through at least two discharge conduits; combining the effluent from at least two of the discharge conduits; flashing the combined effluent in a first flash to form a first flash vapor and a first flash slurry; and condensing at least a portion of the first flash vapor without compression.

In one embodiment in accordance with the present invention, the discharge of slurry effluent through at least one discharge conduit is continuous. Preferably, the discharge of slurry effluent through at least two discharge conduits is continuous. Also preferably, the effluent from all discharge conduits is combined into a single transfer conduit.

In another embodiment in accordance with the present invention, the discharge conduits are located within 45% of the points of symmetry of the loop reactor. Preferably, the discharge conduits are located within 25% of the points of symmetry of the loop reactor. More preferably, the discharge conduits are located within 10% of the points of symmetry of the loop reactor. Most preferably, the discharge conduits are located at the points of symmetry of the loop reactor.

In yet another embodiment in accordance with the present invention, at least one discharge conduit is located in a bottom run of the loop reactor. Preferably, the bottom run is a 180° bend. Also preferably, the discharge conduit is located within 45° of the center of the 180° bend. More preferably, the discharge conduit is located within 25° of the center of the 180° bend. Even more preferably, the discharge conduit is located within 10° of the center of the 180° bend. Most preferably, the discharge is located at the center of the 180° bend.

The present invention also relates to an apparatus for continuously separating polymer solids from a liquid medium comprising an inert diluent and unreacted monomers. In another aspect, the invention relates to an apparatus for continuously separating polymer solids from a liquid medium, drying the polymer, and recovering the diluent and unreacted monomers with a reduction in compression needed for diluent vapor condensation to liquid diluent for reuse in a polymerization process. In another aspect, the invention relates to a method for continuously separating polymer solids from a liquid medium. In another aspect, the invention relates to a method for continuously separating polymer solids from a liquid medium, drying the polymer, and recovering the inert diluent and unreacted monomers for reuse in a polymerization process.

Also, in accordance with the present invention, there is provided an apparatus for continuously recovering polymer solids from a polymerization effluent comprising a slurry of the polymer solids in a liquid medium comprising an inert diluent and unreacted monomers. The apparatus comprises a discharge valve on a slurry reactor, examples of which include slurry loop reactors and stirred tank slurry reactors, for the continuous discharge of a portion of the slurry reactor contents into a first transfer conduit: a first flash tank having a bottom defined by substantially straight sides inclined at an angle to the horizontal equal to or greater than the angle of slide of the slurry/polymer solids; wherein the pressure of the first flash tank and temperature of the polymerization effluent are such that from about 50% to about 100% of the liquid medium will be vaporized and the inert diluent component of the vapor is condensable, without compression, by heat exchange with a fluid having a temperature in the range of about 65° F. to about 135° F.: a first flash tank exit seal chamber, communicating with the first flash tank, of such a length (l) and diameter (d) as to permit such a level of concentrated polymer solids/slurry to accumulate and form a pressure seal in the first flash tank exit seal chamber: a seal chamber exit reducer providing for a continuous discharge of a plug flow of concentrated polymer solids/slurry to a second transfer conduit which communicates the concentrated polymer solids/slurry into a second flash tank wherein the pressure of the second flash tank and temperature of the concentrated polymer solids/slurry are such that essentially all of any remaining inert diluent and/or unreacted monomer will be vaporized and removed overhead for condensation by compression and heat exchange and the polymer solids are discharged from the bottom of the second flash tank for additional processing or storage.

The invention provides also a method for the continuous removal of a stream of polymerization effluent from a slurry reactor through a discharge valve; increasing the heat content of the polymerization effluent during its transit through the first transfer conduit to a temperature below the fusion point of the polymer while continuously communicating the polymerization effluent to a first flash tank having a bottom defined by substantially straight sides inclined at an angle to the horizontal equal to or greater than the angle of slide of the concentrated polymer solids/slurry; continuously vaporizing from about 50% to about 100% of the liquid medium in the first heated flash tank to yield a concentrated polymer solids/slurry and a vapor stream at such a temperature and pressure that the inert diluent content of the vapor is condensable, without compression, by heat exchange with a fluid having a temperature in the range from about 65° F. to about 135° F.; continuously discharging the concentrated polymer solids/slurry from the first flash tank to a first flash tank exit seal chamber of such a length (l) and diameter (d) that a volume of concentrated polymer solids/slurry is continuously maintained so as to form a pressure seal in the first flash tank exit seal chamber; continuously discharging the concentrated polymer solids/slurry from the first flash tank seal chamber through a seal chamber exit reducer defined by substantially straight sides inclined at an angle to that of horizontal equal to or greater than the angle of slide of the polymer solids which remain after removal of about 50 to 100% of the inert diluent therefrom; communicating a continuous plug flow of concentrated polymer solids/slurry from the first flash tank exit seal chamber through the seal chamber exit reducer to a second transfer conduit which communicates the continuous plug flow of concentrated polymer solids/slurry to a second flash tank; and continuously vaporizing essentially all of any remaining inert diluent and/or unreacted monomer in a second flash tank operated at a lower pressure than the first flash tank; condensing the vaporized inert diluent and/or unreacted monomer from the second flash tank by compression and heat exchange; and continuously discharging the essentially dried polymer slurry from the second flash tank for further processing or storage.

The present invention also relates to an apparatus for capturing a higher weight percentage of polymer solids from a circulating slurry in a loop reactor than the weight percentage of solids in the circulating slurry. The apparatus includes a conduit having a first end, wherein the first end extends for a distance into the loop reactor. The conduit also has portions defining an opening wherein the opening is positioned relative to the direction of the circulating slurry. Desirably, the opening may be facing the direction of flow of the circulating slurry. Additionally, a portion of the conduit may extend outwardly from the loop reactor for discharging, continuously or otherwise the polymer solids from the loop reactor.

The present invention also provides a process for capturing a higher weight percentage of polymer solids from a circulating slurry in a loop reactor than the weight percentage of polymer solids in the circulating slurry. This process includes the step of extending for a distance into a loop reactor a conduit having portions defining an opening wherein the opening is extends into the circulating slurry. Additionally, this process may include the step of discharging, continuous or otherwise, the polymer solids from the loop reactor through a portion of the conduit extending outwardly from the loop reactor.

Of course, the invention can also include various combinations of the embodiments disclosed herein.

The present invention also provides an apparatus for purging polymer solids from a conduit connected to a loop reactor and in fluid communication with the loop reactor. This apparatus includes a sensor, a first valve in fluid communication with the conduit, a second valve positioned between a first inert diluent and the conduit, wherein the first inert diluent is in fluid communication with the conduit between the loop reactor and the first valve. In response to a signal produced by the sensor, the first valve is closed and the second valve is opened allowing the first inert diluent to enter the conduit in sufficient quantities and under sufficient pressure to purge polymer solids from the conduit. This apparatus may further include a third valve positioned between a second inert diluent and the conduit, wherein the second inert diluent is in fluid communication with the conduit between the loop reactor and the first valve. In this way, when the first valve is open and the second valve is closed the third valve is opened allowing the second inert diluent to enter the conduit.

The present invention also provides a process for purging polymer solids from a conduit connected to a loop reactor and in fluid communication with the loop reactor comprising. This process includes the steps of (1) closing a first valve in response to a first signal from a first sensor, wherein the first valve is connected to and in fluid communication with the conduit, (2) opening a second valve in response to a second signal from a second sensor, wherein the second valve is fluid communication between a first inert diluent and the conduit, and wherein the first inert diluent is in fluid communication with the conduit between the loop reactor and the first valve, and (3) flowing sufficient quantities of the first inert diluent under sufficient pressure into the conduit to purge polymer solids from the conduit. In this process the first and second sensors may be a common sensor and the first and second signal may be a common signal.

The present invention also provides an apparatus for returning fines to a polymerization slurry in a loop reactor. The apparatus includes a discharge valve for discharging a portion of the polymerization slurry from the loop reactor into a first transfer conduit. The first transfer conduit communicates the polymerization slurry into a first flash tank. The first flash tank converts a portion of the polymerization slurry into a first fluid, such as a vapor. The first fluid includes a portion of the diluent and the fines from the polymerization slurry. A second transfer conduit communicates the first fluid to a first cyclone. The first cyclone converts a portion of the first fluid into a second fluid, such as a vapor. The second fluid includes a portion of the diluent and the fines. A third transfer conduit communicates the second fluid into a heat exchanger. The heat exchanger converts the second fluid into a liquid comprising the diluent and the fines. A fourth transfer conduit returns the liquid to the polymerization slurry in the loop reactor. This apparatus may also include a first transfer conduit heater for heat exchange between the first transfer conduit heater and the polymerization slurry.

The present invention also provides a process for returning fines to a polymerization slurry in a loop reactor. The process includes (i) discharging a portion of the polymerization slurry from the loop reactor, (ii) communicating the discharge polymerization slurry into a first flash tank, (iii) converting in the flash tank a portion of the polymerization slurry into a first fluid, the first fluid comprising a diluent and the fines, (iv) communicating the first fluid from the first flash tank to a first cyclone, (v) converting in the cyclone a portion of the first fluid into a second fluid comprising the diluent and the fines, (vi) communicating the second fluid into a heat exchanger, (vii) converting in the heat exchanger the second fluid into a liquid comprising the diluent and the fines, and (viii) returning the liquid to the polymerization slurry in the loop reactor.

The present invention further provides an apparatus and process for producing polymer from a polymerization slurry in a loop reactor operating at a space time yield greater than 2.8 lbs/hr-gal. In this instance, the polymer is formed in the polymerization slurry which includes a liquid medium and solids. The polymerization slurry is discharged into a first transfer conduit. The polymerization slurry is referred to as a polymerization effluent upon leaving the loop reactor. The polymerization effluent is heated in the first transfer conduit to a temperature below the fusion temperature of the polymer solids. The heated polymerization effluent is communicated through the first transfer conduit to a first flash tank. In the first flash tank, from about 50% to about 100% of the liquid medium is vaporized. The vapor is condensed by heat exchange. Polymer solids are discharge from the first flash tank to a second flash tank through a seal chamber of sufficient dimension such as to maintain a volume of polymer solids in the seal chamber sufficient to maintain a pressure seal. The polymer solids are then communicated to a second flash tank. In the second flash tank, the polymer solids are exposed to a pressure reduction from a higher pressure in the first flash tank to a lower pressure in the second flash. The polymer solids are then discharging from the second flash tank. Additionally, the weight percent of solids in the polymerization slurry may be greater than 47. The loop reactor may be operated at a total recirculating pumping head/reactor distance of greater than 0.15 ft/ft. The loop reactor may also be operated with a recirculating pumping head greater than or equal to 200 ft. and have more than eight vertical legs, desirably between 10 and 16 vertical legs, more desirably between 10 and 12 vertical legs, most desirably 12 vertical legs. The volume of polymerization slurry in the loop reactor may be greater than 20,000 gallon.

An object of the present invention is to provide both an apparatus and method for the continuous two stage flash drying of the polymer solids following the continuous removal of the polymerization effluent comprising polymer solids and liquid medium comprising inert diluent and unreacted monomers from a slurry reactor through a point discharge valve, a continuous solids level control in the first flash tank exit seal chamber that provides a pressure seal therein which enables the first flash tank to operate under a substantially greater pressure than the second flash tank while polymer solids are continuously discharged through the seal chamber exit reducer into the second transfer conduit and further into the second flash tank which eliminates plugging in the first flash tank and the continuous liquification of from about 50% to about 100% of the inert diluent vapor by heat exchange rather than compression.

Another object of the invention is to eliminate the need for a settling leg on the slurry reactor and the intermittent high pressure pulse in the slurry reactor caused by periodic discharging of the contents of the settling leg. Another object of the present invention is to improve safety by eliminating the possibility of plugging in a settling leg.

Another object of the invention is to eliminate plugging in equipment downstream from the discharge valve. In a settling leg of a polymerization reactor polymerization continues and the heat of reaction further heats the liquid medium and a potential exists for some of the polymer solids to dissolve or to fuse together. As the contents of the settling leg exit the discharge valve, the pressure drop causes flashing of some of the liquid medium which results in cooling the remaining liquid medium causing the dissolved polymer to precipitate which tends to plug downstream equipment. The present invention which eliminates the need for a settling leg also eliminates this potential for downstream equipment plugging by avoiding the initial dissolution or fusion of the polymer solids.

Another object of the present invention is to increase the reactor through-put by the use of continuous discharge and increased ethylene concentrations in the liquid medium, e.g., greater than or equal to 4 weight percent at reactor outlet, desirably from 4 weight percent to 8 weight percent, still more desirably from 5 weight percent to 7 weight percent. Settling legs limit ethylene concentrations due to an increased tendency to plug downstream equipment caused by accelerated reaction within the settling leg. A continuous polymerization effluent slurry flow allows ethylene concentrations to be limited only by the ethylene solubility in the liquid diluent in the reactor, thereby increasing the specific reaction rate for polymerization and increasing reactor throughput.

Another object of the present invention is to increase the weight percent (wt %) of polymer solids in the polymerization slurry circulating in the polymerization zone in the loop reactor. Desirably, the wt % of polymer solids in the polymerization slurry is greater than 45, more desirably, from 45 to 65, still more desirably from 50 to 65, and most desirably from 55 to 65.

Another object of the present invention is to increase the space time yield (STY), expressed in terms of pounds per hour-gallon (lbs/hr-gal). Desirably, the STY is greater than 2.6, more desirably from 2.6 to 4.0, and most desirably from 3.3 to 4.0.

Other aspects, objects, and advantages of the present invention will be apparent from the following disclosure and FIGS. 1 and 2.

The claimed apparatus and process provide several advantages over the prior art including: (1) allowing for a continuous processing of the contents of a slurry reactor from the point of discharge of the polymerization slurry effluent through a discharge valve; a first flash tank; a seal chamber; a seal chamber exit reducer; and therefrom to a second flash tank, (2) significantly increasing ethylene concentration in the loop reactor liquid medium thereby increasing reactor through-put, (3) significantly increasing the wt % of polymer solids in the polymerization slurry, (4) significantly increasing reactor space time yield and (5) energy consumption is reduced by reducing the need to compress and/or distill the reactor vapor-liquid effluent. Recycling compressors and other downstream equipment can be reduced in size or eliminated.

The present invention also provides a loop reactor which comprises: at least 8 vertical legs; at least two discharge conduits located on opposite sides of at least one loop reactor vertical plane of symmetry; and at least two feed inlets located on opposite sides of at least one loop reactor vertical plane of symmetry. In a preferred embodiment in accordance with the present invention, there is at least one discharge conduit and at least one feed inlet on one side of at least one loop reactor vertical plane of symmetry and at least one discharge conduit and one feed inlet on the other side of the same plane of symmetry.

In one embodiment in accordance with the present invention, the loop reactor also comprises at least two catalyst inlets located on opposite sides of the at least one loop reactor vertical plane of symmetry. In another embodiment in accordance with the present invention, the loop reactor further comprises at least two circulators located on opposite sides of the at least one loop reactor vertical plane of symmetry. In a preferred embodiment in accordance with the present invention, there is at least one discharge conduit, at least one feed inlet, at least one circulator, and at least one catalyst inlet on one side of at least one vertical plane of symmetry and at least one discharge conduit, at least one feed inlet, at least one circulator, and at least one catalyst inlet on the other side of the same plane.

The present invention also provides a process of converting a loop reactor into multiple loop reactors which comprises: starting with a loop reactor comprising at least 8 vertical legs; at least two non-vertical conversion runs, each non-vertical run connected in fluid flow communication with two vertical legs; at least two feed inlets; and at least two continuous discharge conduits; disconnecting at least one connection of at least two conversion runs; and reconnecting each said conversion run in fluid flow communication with a different vertical leg in such a manner to form multiple loop reactors, each having at least one feed inlet and at least one continuous discharge conduit. In one embodiment in accordance with the present invention, the multiple loop reactors comprise two loop reactors in series formed by connecting at least one discharge conduit of a first of the multiple reactors in fluid flow communication with a feed inlet of a second of the multiple reactors. Preferably, at least one of the conversion runs is a bottom run. More preferably, both conversion runs are bottom runs. Also preferably, at least two of the conversion runs are located parallel and adjacent to each other on the loop reactor before being disconnected.

In another embodiment in accordance with the present invention, at least one of the conversion runs is a top run. Preferably, in such embodiment, both conversion runs are top runs. In another embodiment in accordance with the present invention, at least one of the at least two continuous discharge conduits is located in a bottom run other than a conversion run. Preferably, at least two of the at least two continuous discharge conduits are located at bottom runs other than conversion runs. In yet another embodiment in accordance with the present invention, at least one of the at least two feed inlets is located at a bottom run other than the conversion runs. Preferably, at least two of the at least two feed inlets are located at bottom runs other than the conversion runs.

In a preferred embodiment in accordance with the present invention, the multiple loop reactors comprise first and second reactors each having at least one feed inlet and at least one continuous discharge conduit. More preferably, at least one discharge conduit of one of the reactors is in fluid flow communication with at least one feed inlet of the other reactor. In another preferred embodiment in accordance with the present invention, the first and the second reactor each has at least one catalyst inlet and at least one circulator. Even more preferably, each multiple loop reactor has at least one feed inlet for feeding at least one of monomer, co-monomer, co-catalyst, diluent, polymer modifier, or mixtures thereof.

In one embodiment in accordance with the present invention, the at least two conversion runs have substantially equal length. In another embodiment in accordance with the present invention, two of the multiple reactors have substantially the same volume. In yet another embodiment in accordance with the present invention, two of the reactors have unequal volumes.

The present invention also provides a loop reactor system comprising a) at least 8 parallel legs; and b) at least 8 connector fittings, each fitting adapted to connect a pair of the parallel legs, such that assembly of the parallel legs and the connector fittings forms a single continuous closed loop; wherein at least 2 of the connector fittings are adapted to connecting alternate pairs of parallel legs, such that assembly of the parallel legs and the connector fittings forms at least 2 continuous closed loops. Preferably, the at least 2 continuous closed loops are in series. More preferably, the at least 2 continuous closed loops each have at least one feed inlet, at least one catalyst inlet, at least one circulator, and at least one discharge conduit.

DETAILED DESCRIPTION OF THE INVENTION

Figure 1:
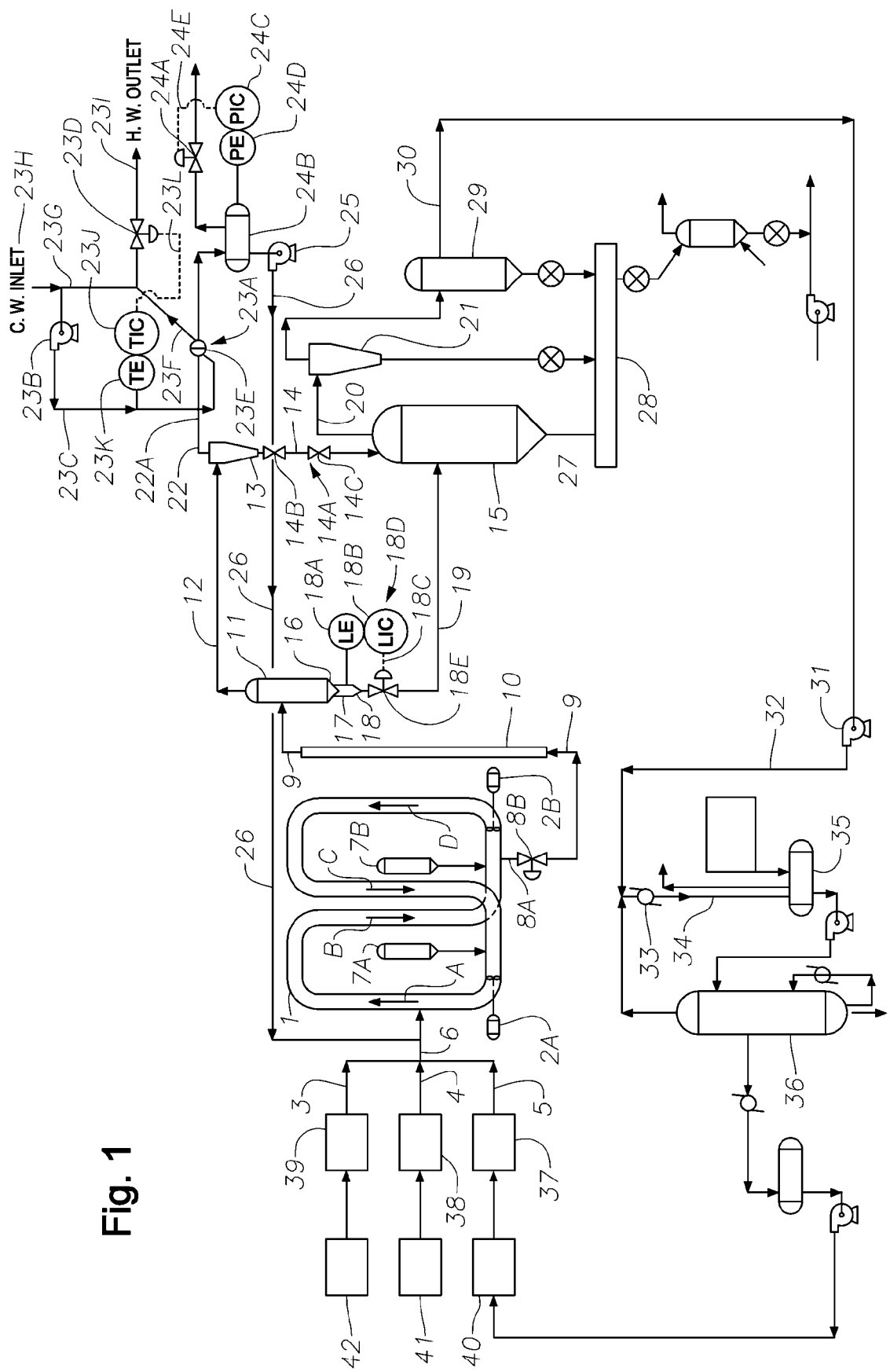
FIGS. 1 and 2 are schematic diagrams illustrating an apparatus for continuously separating polymer solids from diluent and unreacted monomer in accordance with the present invention.

As used herein, the term "polymerization slurry" means substantially a two phase composition including polymer solids and liquid circulating within the loop reactor. The solids include catalyst and a polymerized olefin, such as polyethylene. The liquids include an inert diluent, such as isobutane, with dissolved monomer, comonomer, molecular weight control agents, such as hydrogen, antistatic agents, antifouling agents, scavengers, and other process additives.

As used herein, the term "space time yield" (STY) means the production rate of polymer per unit of loop reactor volume or polymerization slurry volume.

As used herein, the term "catalyst productivity" means weight of polymer produced per weight of catalyst introduced into the loop reactor.

As used herein, the term "polymer residence time" means the average duration that a polymer particle remains within the loop reactor.

As used herein, the term "multiple" means more than one.

As used herein, the term "constant reaction kinetics" means the monomer concentrations, wt. %, taken at any two points along the loop reactor, to be within 20% of the higher value.

As used herein, "points of symmetry" means points that are equidistant along the entire length of the loop reactor. For example, for a loop reactor that is 1200 feet long, two points of symmetry would be spaced 600 feet apart, three points of symmetry would be spaced 400 feet apart, four points of symmetry would be located 300 feet apart, etc. By way of non-limiting example, three catalyst inlets located at the points of symmetry of the reactor would be located 400 feet apart for a 1200 foot reactor. Further by way of non-limiting example, for a 1200 foot reactor, three feed inlets located within 25% of their points of symmetry would each be located within 25% of the 400 foot points of symmetry or from 300 to 500 feet apart, it being understood that one of more of these elements will not be equidistant from the others. For example, for a 1200 foot loop reactor having three catalyst inlets, it would within the scope of the present invention for a first and second catalyst inlet to be 400 feet apart, with the third inlet spaced 300 feet from the second catalyst inlet and 500 feet from the first.

As used herein, the term "flash slurry" means polymer solids containing entrained (absorbed) liquid medium and entrained flash vapor (if any) and/or such polymer solids slurried in "free-flowing" liquid medium.

As used herein, the term "vertical plane of symmetry" means an imaginary vertical plane, drawn through any two or more vertical reactor legs, which results in an equal number of vertical reactor legs located on each side of the plane. As would readily occur to one of ordinary skill in the art having the benefit of the present disclosure there could be more than one such vertical plane of symmetry. It would be within the scope of the present invention, for example, for at least two discharge conduits to be on opposite sides of any one or more of such multiple vertical planes of symmetry.

The present invention is applicable to any mixture which comprises a slurry of polymer solids and a liquid medium comprising an inert diluent and unreacted polymerizable monomers including slurries resulting from olefin polymerization. The olefin monomers generally employed in such reactions desirably include 1-olefins having from 2 up to 8 carbon atoms per molecule. Typical examples include ethylene, propylene, butene, pentene, hexene and octene. Other examples include vinyl aromatic monomers, like styrene and alkyl-substituted styrene, geminally distributed monomers such as isobutylene and cyclic olefins, such as norbornene and vinyl norbornene. Typical diluents employed in such olefin polymerizations include saturated aliphatic hydrocarbons having 3 to 8, preferably 3 to 4 carbon atoms per molecule, such as propane, isobutane, propylene, n-butane, n-pentane, isopentane, n-hexane, isooctane, and the like. Of these diluents those of 3 to 4 carbon atoms per molecule are preferred, and isobutane is most preferred.

According to one embodiment in accordance with the present invention, the rate of discharge of the polymerization effluent is such as to allow a continuous process stream from the slurry loop reactor from the point of discharge of the liquified polymerization effluent through a single point discharge valve and also through the first flash tank and the associated vapor recovery and solids recovery systems. The rate of discharge of the polymerization effluent is such as to maintain a constant pressure in the slurry reactor and to eliminate intermittent high pressure pulses associated with a discharge of a portion of the reactor contents that occurs with settling legs on slurry reactors.

The temperature to which the polymerization effluent which is discharged from the reactor is heated during transit to the first flash tank for vaporization is below the fusion temperature of the polymer. This may be accomplished by appropriate heating of this first transfer conduit. The quantity of heat to be supplied to the polymerization effluent during its transit through this first conduit to the first flash tank should preferably be at least equal to that quantity of heat which equals the heat of vaporization of that quantity of inert diluent which is to be flash vaporized in the first flash tank. This then will provide for the concentrated polymer solids formed in the first flash tank to be passed to the second flash tank to pass thereto at a higher solids temperature and thus facilitates the removal of residual diluent in the pores of such polymer solids by the operation of the second flash tank. That quantity of heat transferred to the polymerization effluent during its transit through the first transfer conduit to the first flash tank may even be greater, provided only that the quantity of heat so transferred will not cause the polymer solids therein to become heated to such a temperature at which they will tend to fuse or agglomerate one with another.

The concentrated polymer solids/slurry are discharged from the first flash tank into a first flash tank exit seal chamber of such a length (l) and diameter (d) so as to provide a volume sufficient to maintain a volume of concentrated polymer solids/slurry sufficient to maintain a pressure seal in the exit seal chamber. The concentrated polymer solids/slurry are discharged from the exit seal chamber through an exit seal chamber reducer to a second transfer conduit which communicates the concentrated polymer solids/slurry as a plug flow to a second flash tank. The exit seal chamber reducer is defined by substantially straight sides inclined at an angle to that of horizontal equal to or greater than the angle of slide of the concentrated polymer solids/slurry.

The pressure for the first flash step will vary depending on the nature of the diluent and unreacted monomers and the temperature of the polymerization effluent. Typically, pressures in the range of from about 140 psia to about 315 psia can be employed; more preferably from about 200 psia to about 270 psia; and most preferably from about 225 psia to about 250 psia.

The heat exchanging fluid used to condense the vapor from the first flash step is at a temperature in the range of from about 65° F. to about 150° F. A preferred embodiment uses a heat exchange fluid at a temperature of from about 75° F. to about 140° F. A most preferred embodiment uses a heat exchange fluid at a temperature of from about 85° F. to about 130° F.

Maintaining constant reaction kinetics is desirable when a large loop reactor is used. In a large loop reactor, the concentrations of the reactants, such as un-reacted monomers, are high at and just downstream of the feeding inlet. The concentrations of these reactants decrease along the loop length as the reaction goes on. This phenomenon creates reactant concentration gradients along the loop, which can result in lower production yield, final product quality problems, and reactor control difficulties. It is, accordingly, desirable to reduce these concentration gradients by using multiple feed inlets for the reactants. For similar reasons, it is desirable to have even distribution of catalyst, co-catalyst, polymer modifiers, and/or process additives by using multiple inlets therefor.

"Constant reaction kinetics" is defined herein as the difference of reactant monomer concentrations, measured in wt. %, taken at any two points along the loop reactor, to be within 20% of the higher value. As a non-limiting example illustrated in FIG. 5, two samples are taken from two sampling ports 505, 506 at the same time during the reaction and are analyzed for the concentrations of un-reacted ethylene. Two values are obtained: 4.0 wt. % and 3.5 wt. %. Therefore the difference of the two values is 0.5 wt. % and it is within the 20% of the higher value (20% of 4.0 wt. %). This indicates that the loop reactor has "constant reaction kinetics." The locations of the two sampling ports 505, 506 can be anywhere along the loop reactor. The method used for concentration analysis can be any known method as long as the same method is used for analyzing both samples.

One aspect of the present process is to produce polymer in a large continuous slurry loop reactor with catalyst fed into the loop reactor from multiple catalyst inlets, by way of non-limiting illustration, at 502A, 502B, 502C, 502D. Preferably, the process comprises at least one, preferably multiple, feed inlets 503A, 503B, 503C, 503D for at least one of monomer, co-monomer, co-catalyst, diluent, polymer modifier, process additive, or mixtures thereof. The polymer modifiers can be used to change the polymer structure and properties. The process additives can be used to improve reactor operating efficiency such as to reduce static effect of running a large loop reactor. As would readily occur to one of ordinary skill in the art having the benefit of the present disclosure, many different co-monomers, co-catalysts, diluents, polymer modifiers, and process additives can be used in this process. For example, in a typical ethylene polymerization, ethylene can be fed through one or more of the feed inlets 503A, 503B, 503C, 503D in order to maintain a relatively constant ethylene concentration along the loop reactor 1. The process preferably also comprises at least one circulator 501A, 501B, 501C, and/or 501D in the loop reactor. More preferably the circulator is a pump and/or comprises a motor (507) driven device to increase the pressure of the circulating slurry in the loop reactor.

In one embodiment in accordance with the present invention, at least one of the catalyst inlets 502A, 502B, 502C, and/or 502D is located at the suction end of a circulator 501A, 501B, 501C, and/or 501D. At least one feed inlet 503A, 503B, 503C, and/or 503D is preferably located at the discharge end of at least one circulator. More preferably, there is at least one catalyst inlet and at least one feed inlet located at the suction end and discharge end, respectively, of the same circulator.

The locations of catalyst inlets, circulators, and feed inlets are strategically placed along the loop reactor to maintain constant reaction kinetics along the loop reactor, generally within 45%, preferably within 25%, more preferably within 10% of points of symmetry, and most preferably placed at their points of symmetry. "Points of symmetry" means points that are equidistant along the entire length of the loop reactor. For example, for a loop reactor that is 1200 feet long, two points of symmetry would be spaced 600 feet apart, three points of symmetry would be space 400 feet apart, four points of symmetry would be located 300 feet apart, etc. By way of non-limiting example, three catalyst inlets located at the points of symmetry of the reactor would be located 400 feet apart for a 1200 foot reactor.

Figure 6:
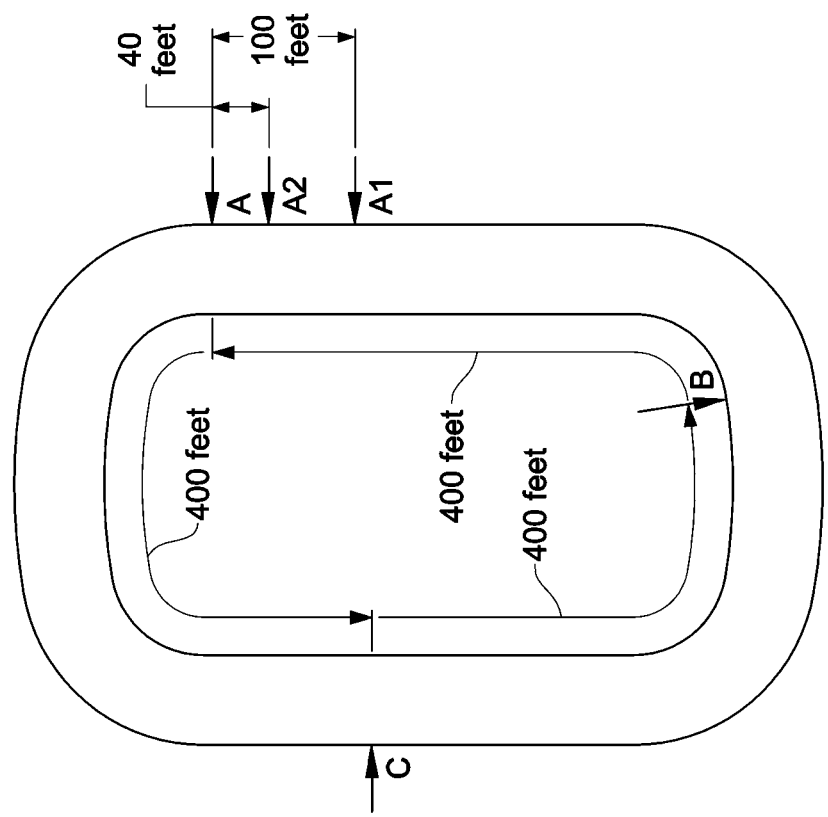
FIG. 6 is a schematic illustrating an example of "points of symmetry" for three feed inlets.

This can further be understood by way of non-limiting illustration in FIG. 6. FIG. 6 illustrates a 1200 foot reactor wherein the points of symmetry (A, B, C) are 400 feet apart. The distance between A and A1 is 25% of the 400 feet, i.e. 100 feet. The distance between A and A2 is 10% of the 400 feet, i.e. 40 feet. Three feed inlets located within 25% of their points of symmetry would each be located within 25% of the 400 foot points of symmetry or from 300 (between A1-B) to 500 (between C-A1) feet apart. It is understood that one or more of these elements will not be equidistant from the others. For example, for a 1200 foot loop reactor having three catalyst inlets, it would within the scope of the present invention for a first and second catalyst inlet to be 400 feet apart, with the third inlet spaced 300 feet from the second catalyst inlet and 500 feet from the first.

The loop reactor length can be at least 750 feet, preferably at least 1,000 feet, and more preferably at least 1,400 feet. Independently, the loop reactor can have at least 6 legs, preferably at least 8 legs, and more preferably at least 12 legs. Also independently, the loop reactor can also be at least 10,000 gallons, preferably at least 20,000 gallons, more preferably at least 35,000 gallons, and most preferably at least 40,000 gallons in volume.

Figure 5:
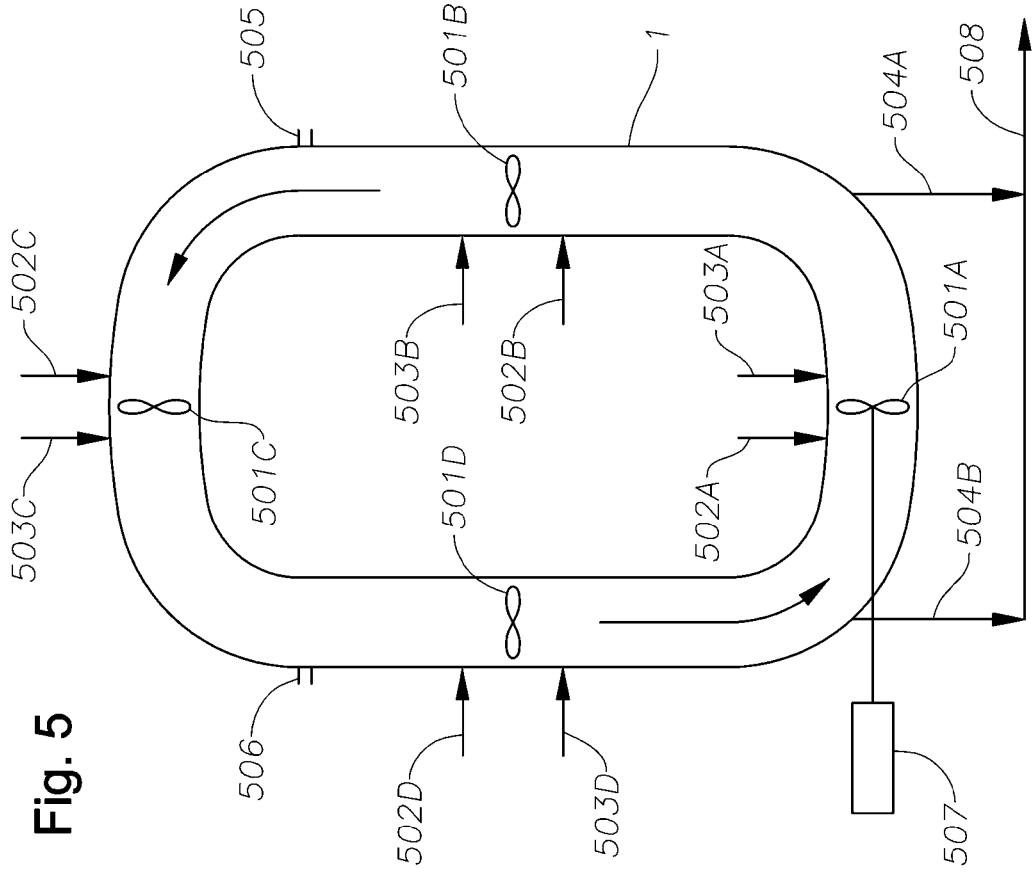
FIG. 5 is a schematic view of a loop reactor with multiple catalyst inlets, feed inlets, circulators, and discharge conduits.

Turning again to FIG. 5, for example, to strategically locate 4 circulators 501A, 501B, 501C, 501D along a 1,000 feet long loop reactor 1, the points of symmetry of the 4 circulators are 250 feet apart. The most preferred location of circulators 501A, 501B, 501C, 501D are at the points of symmetry. The 4 circulators will be about 250 feet apart from each other. The catalyst inlets 502A, 502B, 502C, 502D and feed inlets 503A, 503B, 503C, 503D are also, ideally, spaced evenly at their points of symmetry along the loop reactor and preferably at the suction and discharge ends of the same circulator. While FIG. 5 illustrates an example wherein each of the 4 circulators has a catalyst inlet and a feed inlet at the circulator's suction and discharge ends, respectively, it need not be so in operation. Constant reaction kinetics can be achieved by operating a number of combinations of circulator, catalyst inlet, and feed inlet, arrangements as will readily occur to one of ordinary skill in the art having the benefit of the present disclosure. For example, constant reaction kinetics can be achieved in some applications with two circulators, three catalyst inlets, and four feed inlets.

Although "constant reaction kinetics" is defined as the difference of the reactant monomer concentrations, measured in wt. %, taken at any two points along the loop reactor, to be within 20% of the higher value, it is preferred that the difference of the two reactant monomer concentrations is within 10% of the higher value, more preferably within 5% of the higher value. This can be accomplished by strategically placing the catalyst inlets, feed inlets and circulators as disclosed above and by operating a number of combinations of circulator, catalyst inlet, and feed inlet, arrangements as will readily occur to one of ordinary skill in the art having the benefit of the present disclosure.

Another aspect of the present invention is to produce polymer in a continuous slurry loop reactor which comprises: reacting a monomer in a hydrocarbon diluent to form a polymerization slurry of polymer solids in a liquid medium; discharging a portion of the polymerization slurry as effluent which comprises a slurry of discharged polymer solids in a discharged liquid medium through at least two discharge conduits; combining the effluent from at least two of the discharge conduits; flashing the combined effluent in a first flash to form a first flash vapor and a first flash slurry; and condensing at least a portion of the first flash vapor without compression. A non-limiting schematic illustration of the multiple discharge conduits is shown as 504A and 504B of FIG. 5. Preferably, the discharge of slurry effluent through at least one discharge conduit 504A and 504B is continuous and more preferably the discharge of slurry effluent through at least two discharge conduits is continuous. With multiple discharge conduits, the production can continue even when one discharge conduit is taken out of service.

Also preferably, the effluent from all discharge conduits is combined into a single transfer conduit 508. It is understood that the aspect of multiple slurry discharge can be considered alone or in combination with all other aspects of the present invention described herein.

The discharge conduits are strategically placed along the loop reactor, generally within 45%, preferably within 25%, more preferably within 10% of points of symmetry, and most preferably placed at their points of symmetry. FIG. 5 illustrates a design where two discharge conduits 504A and 504B are located at or near the bottom run of the loop reactor 1. At least one bottom run of the loop reactor is preferably a 180° bend. While more discharge conduits could be provided on each bend, it is preferable that the at least two discharge conduits are each located within a separate 180° bend bottom run in the reactor, i.e., one discharge conduit per one bottom run. The slurry from both discharge conduits are preferably combined into one transfer conduit 508.

Figure 7:
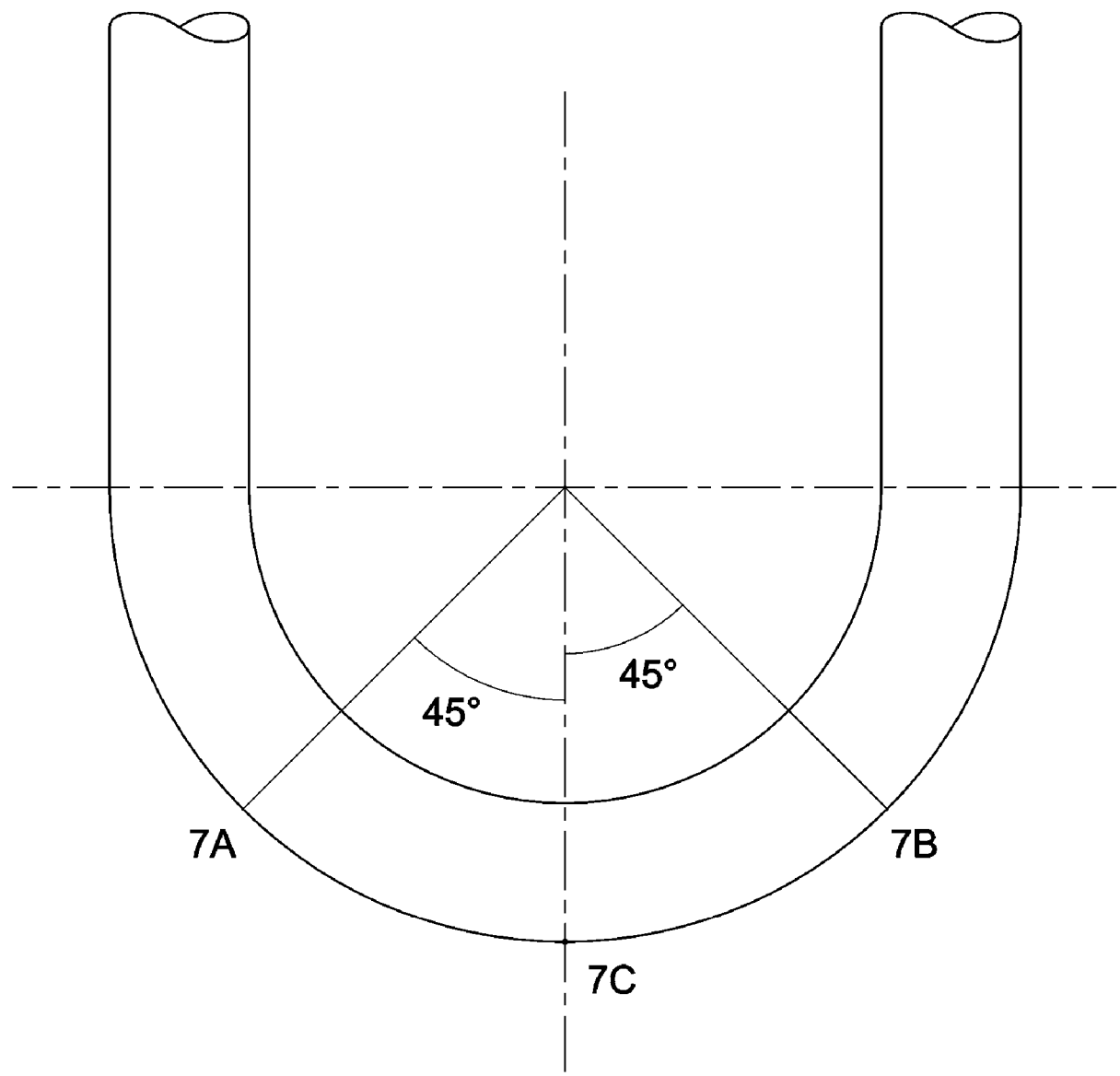
FIG. 7 is a schematic illustrating one type of the bottom runs of the loop reactor.

As shown in FIG. 7, the discharge conduit is preferably located within 45° of the center (7C) of the bottom run (between 7A and 7B). Preferably, the location is within 25° of the center of the 180° bend. More preferably, the discharge conduit is within 10° of the center of the 180° bend. Most preferably, the discharge conduit is located at the center of the 180° bend (7C).

As described above, the loop reactor length can be at least 750 feet, preferably at least 1,000 feet, and more preferably at least 1,400 feet. Independently, the loop reactor can have at least 6 legs, preferably at least 8 legs, and more preferably at least 12 legs. Also independently, the loop reactor can also be at least 10,000 gallons, preferably at least 20,000 gallons, more preferably at least 35,000 gallons, and most preferably at least 40,000 gallons in volume. In one embodiment in accordance with the present invention with all the disclosed features, a loop reactor having a length of greater than 1,350, preferably greater than 1,400, more preferably greater than 1,450 feet, can be effectively operated. In another preferred embodiment, a loop reactor having greater than 8 legs, preferably greater than 10 legs, more preferably greater than 12 legs, can be effectively operated. Although the "legs" are generally in an upright position, in all preferred embodiments, these legs are vertical or substantially vertical.

In addition to higher production capability, there are other advantages of running a large loop reactor of at least 8 vertical legs. For example, one advantage of running a large loop reactor with multiple feed inlets, multiple catalyst inlets, multiple circulators, multiple discharge conduits, and with 8 or more vertical legs is that the large loop reactor can be converted into multiple loop reactors. For instance, in accordance with the present invention, a loop reactor of 12 vertical legs can be easily reconnected into 1) two 6-leg reactors or 2) one 4-leg reactor and one 8-leg reactor. Although the multiple loop reactors can be run in any mode, it is preferred that the smaller loop reactors are connected in series. This is particularly desirable when, for instance, the production requires a switch from the production of unimodal polymers to the production of bimodal polymers. This improves equipment use efficiency and reduces equipment downtime.

Figure 8:
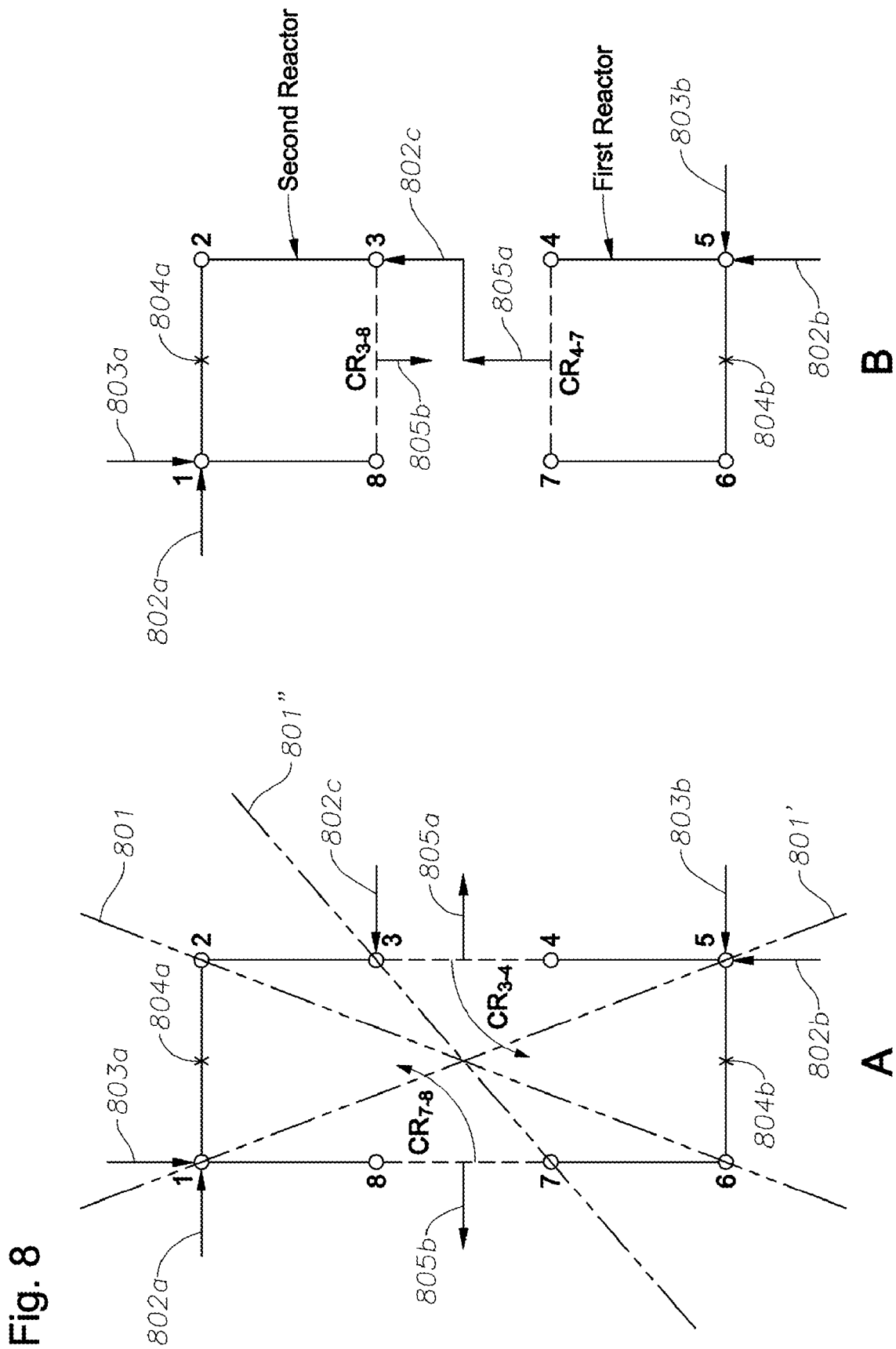
FIG. 8 is a schematic illustrating the plain view of an 8-leg loop reactor before and after conversion from a single loop reactor into multiple reactors.

In order to facilitate such higher utilization of equipment, the loop reactor, prior to the reconnection, should have at least 8 vertical legs and at least two non-vertical conversion runs. The conversion runs are non-vertical runs that connect in fluid flow communication with vertical legs. The conversion runs are the non-vertical runs of the loop reactor that will be disconnected and reconnected during the conversion from the at least 8-leg reactor into multiple reactors. The at least 8-leg reactor should have at least two discharge conduits and at least two feed inlets located on opposite sides of at least one loop reactor vertical plane of symmetry. The loop reactor vertical plane of symmetry is an imaginary vertical plane, drawn through any two or more vertical reactor legs, which results in an equal number of vertical reactor legs located on each side of the plane. FIG. 8 shows, for example, three such vertical planes of symmetry 801, 801', and 801" in an 8-leg reactor. In accordance with the present invention, at least two feed inlets should be on opposite sides of at least one imaginary vertical plane. In the non-limiting example illustrated in FIG. 8A, feed inlet 802a is on one side of vertical plane 801 and feed inlets of 802b and 802c are on the other side of vertical plane 801. However, with respect to another plane, 801', none of the three feed inlets are on opposite sides of that plane. But this feed inlets layout still falls within the scope of the presently claimed invention since feed inlets 802a and 802b are on opposite sides of at least one plane, 801.

Although it is possible for the discharge conduits to be located on reactor vertical legs, it is preferred that the discharge conduits are located on non-vertical reactor runs. Similarly, the at least 8-leg loop reactor will preferably have at least two catalyst inlets and at least two circulators on opposite sides of at least one loop reactor vertical plane of symmetry. Preferably, the locations of the multiple feed inlets, discharge conduits, catalyst inlets, and circulators of the at least 8-leg loop reactor are strategically located with respect to their points of symmetry and their preferred relationship with each other as discussed above. This will ensure that, after reconnecting the at least 8-leg loop reactor into multiple reactors, each of these multiple reactors will have, at their respective preferred locations, at least 1) one feed inlet, 2) one discharge conduit, 3) one catalyst inlet, and 4) one circulator.

The conversion runs can be loop reactor top runs or bottom runs. Preferably, the conversion runs are bottom runs. More preferably, the bottom runs are 180° bends. To reduce unnecessary piping changes during conversion, it is preferred that the discharge conduits, catalyst inlets, circulators, and feed inlets are not located on any of the conversion runs. However, when the loop reactor has 8 vertical legs prior to conversion, it is preferred to locate the discharge conduits on the conversion runs.

A further understanding of the conversion aspect of the present invention is provided by referring to FIG. 8 which illustrates a non-limiting embodiment of the invention. FIG. 8A illustrates a plain view of an 8-leg loop reactor before conversion and FIG. 8B illustrates a plain view of two 4-leg loop reactors converted from the 8-leg reactor. Although an 8-leg loop reactor may have several vertical planes of symmetry, one imaginary vertical plane of symmetry 801 is referred to. This one vertical plane of symmetry 801 results in an equal number of vertical reactor legs located on each side of the plane, i.e. legs 1, 7, 8 on one side and legs 3, 4, 5 on the other. FIG. 8A also shows the location of three feed inlets 802a, 802b, and 802c; two catalyst inlets 803a and 803b; two circulators 804a and 804b located on two non-vertical runs; and two discharge conduits 805a and 805b on two non-vertical runs. FIG. 8A also shows two conversion runs CR7-8 and CR3-4 located parallel and adjacent to each other.

To convert the illustrated loop reactor into multiple loop reactors in series, connector fittings between CR7-8 and CR3-4 and their respective vertical legs are first disconnected. CR7-8 is then reconnected to legs 3 and 8 to become CR3-8. CR3-4 is reconnected to vertical legs 4 and 7 to become CR4-7. This will result in a first 4-leg loop reactor and a second 4-leg loop reactor as shown in FIG. 8B. As discussed above, when operating the single loop reactor as illustrated in FIG. 8A, effluent from the two discharge conduits 805a and 805b are preferably combined into a common transfer conduit (see also FIG. 5) prior to further effluent treatment/recovery (e.g. heating before entering the first flash). When converting to multiple loop reactors, the effluent from discharge conduits 805a and 805b will no longer be combined. Instead, after the formation of multiple reactors as illustrated in FIG. 8B, discharge conduit 805b is preferably reconnected to a feed inlet of the other reactor so that the effluent from the first reactor enters the second reactor, for example, as illustrated at 802c. In this manner, monomers, or co-monomer, co-catalyst, diluent, polymer modifier, or mixtures thereof, in addition to effluent from the first reactor, may be fed into the second reactor.

Although the non-limiting example of FIG. 8 illustrates that the two conversion runs have equal length, it would be within the scope of the present invention that the two conversion runs have unequal length. In such a situation, non-vertical runs of unequal length may be used to reconnect legs 3-8 and legs 4-7. Similarly, although the non-limiting example of FIG. 8 illustrates that the two converted loop reactors (FIG. 8B) have substantially the same volume, it would be within the scope of the present invention that unequal volume reactors may be formed. For instance, a 12-leg loop reactor may be converted into one 8-leg reactor and one 4-leg reactor in series.

A further understanding of some other aspects of the present invention will be provided by referring to FIG. 1 which illustrates a system comprising an embodiment of the invention.

In the embodiment illustrated in FIG. 1, the polymerization is carried out in a loop reactor 1. It will be understood that while the loop reactor 1 is illustrated with four vertical legs, the loop reactor 1 may be equipped with more legs, desirably eight or more legs, desirable between 8 and 20, more desirable between 8 and 16, most desirable with 12 legs. The polymerization slurry is directionally circulated throughout the loop reactor 1 as illustrated by arrows A-D by one or more pumps, such as axial flow pumps, 2A and 2B. Desirably, the loop reactor 1 is equipped with multiple pumps wherein each pump is dedicated to an even number of legs, such as for example, four legs, six legs, eight legs, etc. Diluent comonomer and monomer are introduced into the loop reactor 1 from the diluent storage vessel 40, the comonomer storage vessel 41, and the monomer source 42 through their respective treater beds 37, 38, and 39 through conduits 5, 4 and 3, respectively, connected to conduit 6. Catalyst is added to the loop reactor 1 through one or more catalyst feed systems 7A and 7B. Normally, catalyst is introduced in a hydrocarbon diluent.

Polymerization slurry may be removed from the loop reactor by continuous discharge through a discharge conduit 8A. It will be understood that the loop reactor 1 may be equipped with one or more discharge conduits 8A. It will be also understood that the discharge conduit(s) 8A may be operated in a continuous or discontinuous mode, but desirably a continuous mode. The discharge conduit 8A extends for a distance through a portion of the wall of the loop reactor 1 and into the circulating polymerization slurry. By extending for a distance into the polymerization slurry, the discharge conduit 8A may remove polymerization effluent from the circulating polymerization slurry over an area defined from near or adjacent the inside wall of the loop reactor 1 to a distance extending into the circulating polymerization slurry. In this way, a higher weight percentage of polymer solids may be formed within the conduit 8A and ultimately removed from the loop reactor 1 than the weight percentage of polymer solids within the otherwise circulating polymerization slurry. A pressure control system (not shown in FIG. 1) operates in concert with the discharge conduit 8A. The discharge conduit 8A and the pressure control system 410 are more clearly illustrated in FIGS. 3 and 4 and will be discussed in greater detail below.

The polymerization effluent passes from the discharge conduit 8A to the discharge valve 8B to a conduit 9 which is provided with a line heater 10 and into the first flash tank 11 which separates vaporized liquid medium from polymer slurry/solids. Conduit 9 has an indirect heat exchange means such as a flash line heater 10.

Vaporized liquid medium comprising diluent and unreacted monomers exit the first flash tank 11 via transfer conduit 12 through which it is passed into a separator, such as a cyclone, illustrated by reference number 13 which separates entrained polymer solids from the vapor. Polymer solids separated by the cyclone 13 are passed via conduit 14 through a dual valving assembly 14A designed to maintain a pressure seal below cyclone 13 to a lower pressure second flash tank 15.

The dual valving assemble 14A includes valves 14B and 14C. The valving assemble 14A in conjunction with conduit 14 operate to periodically discharge polymer solids which have collected in the conduit 14 from the cyclone 13. The valving assembly 14A also maintains the pressure differential between the higher pressure environment in the cyclone 13 and the lower pressure environment in the second flash tank 15. In the operation of the valving assembly 14A, valves 14B and 14C are sequentially opened and closed. At the beginning of this sequence, the valve 14B is open and the valve 14C is closed allowing the polymer solids from the cyclone 13 to collect in the conduit 14. Upon the passage of time and/or the collection of sufficient polymer solids in the conduit 14, the valve 14B closes capturing a portion of the high pressure environment from the cyclone 13 in the conduit 14. After the valve 14B closes, the valve 14C opens and the polymer solids collected in the conduit 14 are forcibly discharged into the flash tank 15 by the differential pressure between the higher pressure environment in conduit 14 and the lower pressure environment in the flash tank 15. After discharging the polymer solids from conduit 14 into the flash tank 15, the valve 14C closes. Once the valve 14C closes, the valve 14B is opened at which time polymer solids will again collect in conduit 14 from the cyclone 13. The above sequence is then repeated.

Figure 2:
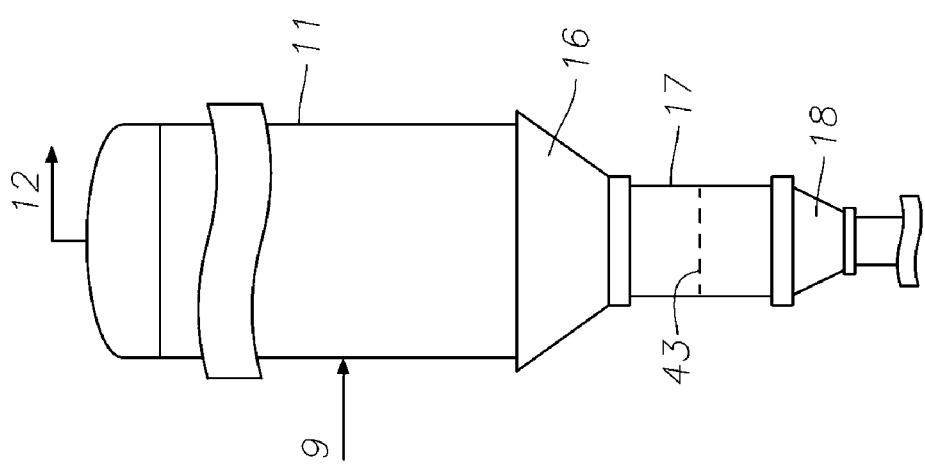

Referring back to the first flash tank 11, the concentrated polymer solids/slurry in the bottom of the first flash tank 11 continuously settles by sliding along the straight line bottom surface 16 thereof into the seal chamber 17 which is illustrated in enlargement FIG. 2. A polymer solids/slurry level 43 is maintained in the seal chamber 17 to eliminate plugging tendencies in first flash tank 11 and to form a pressure seal so that the first flash tank 11 can operate at a substantially higher pressure than the second flash tank 15. Polymer slurry/solids are continuously discharged from the seal chamber 17 into the lower pressure second flash tank 15. The length (l), diameter (d), and volume of the seal chamber 17 and the geometry of the seal chamber exit reducer 18 are chosen so as to provide a variable residence time and provide a continuous plug flow of concentrated polymer solids/slurry to minimize "dead" space and reduce plugging tendencies. The seal chamber 17 length must be sufficient to allow particle (polymer solids) level measurement and control.

Particle level measurement and control may be accomplished by a nuclear level indicating system 18D. The nuclear level indicating system 18D includes a nuclear radiating source (not shown) and receiver or level element 18A in signal communication with a level indicating controller 18B. In operation, the level element 18A generates a signal proportional to the particulate level in the seal chamber 17. This signal is conveyed to the level indicating controller 18B. In response to this signal and a preset value, the level indicating controller 18B sends a signal through a conduit (illustrated by broken line 18C) to a control valve 18E which selectively controls the discharge of polymer solids into a conduit 19.

Typical residence times of the concentrated polymer solid/slurry in the seal chamber 17 are from 5 seconds to 10 minutes, preferable residence times are from 10 seconds to 2 minutes and most preferable residence times from 15-45 seconds. The continuous plug flow of concentrated polymer solids/slurry forms a pressure seal wherein the concentrated polymer solids/slurry have an l/d ratio inside the seal chamber 17 which is typically 1.5 to 8, preferable l/d is 2 to 6 and most preferable is 2.2 to 3. Typically the seal chamber exit reducer 18 sides are inclined, relative to the horizontal, 60-85 degrees, preferable 65-80 degrees and most preferable 68-75 degrees. The seal chamber exit reducer 18 geometry is defined by substantially straight sides inclined at an angle to that of horizontal equal to or greater than the angle of slide of the concentrated polymer slurry/solids and communicates the concentrated polymer solid/slurry to a second transfer conduit 19 which communicates with a feed inlet of flash tank 15. In flash tank 15 substantially all of any remaining inert diluent and unreacted monomer in the concentrated polymerization effluent is vaporized and taken overhead via conduit 20 to a second cyclone 21.

Referring now to the cyclone 13, the major portion of the liquid medium in the polymerization effluent may be been taken to cyclone 13 as vapor. The vapor after having a portion of the entrained catalyst and polymer solids removed is passed via conduit 22 through a heat exchanger system 23A wherein the vapor at a pressure from about 140 psia to about 315 psia is condensed by indirect heat exchange with a heat exchange fluid such as to eliminate the need for compression. The portion of the entrained catalyst and polymer solids not removed by the cyclone 13 are generally smaller in size and may be referred to as "fines", "polymer fines" and/or "catalyst fines". These fines generally include unreacted and/or under-reacted catalyst.

The heat exchanger system 23A includes a heat exchanger 23E and a tempered water circulating pump 23B connected to the heat exchanger 23E by conduit 23C. A tempered water temperature control valve 23D is connected to the heat exchanger 23E and water circulating pump 23B by conduits 23F and 23G, respectively. Cooling water from a cooling water source (not shown) is conveyed via a cooling water conduit 23H into the conduit 23G between the control valve 23D and the circulating pump 23B. A temperature indicating controller (TIC) 23J is connected between the control valve 23D and the conduit 23C. Between the controller 23J and the conduit 23C resides a temperature element 23K.

The heat exchanger system 23A operates to control the amount of vapor condensed in the heat exchanger 23E. This is accomplished by controlling the flow of cooling water introduced into the conduit 23G from the conduit 23H by exhausting heated water formed in the heat exchanger 23E. The heated water from the heat exchanger 23E is conveyed to the control valve 23D via the conduit 23F. The heated water exits the control valve 23D via the conduit 23I.

More specifically, cooling water from the conduit 23H entering the conduit 23G mixes with circulating tempered water in the conduit 23G, the mixture thereof enters the pump 23B. The water exiting the pump 23B enters the conduit 23C, a portion of which contacts the temperature element 23K, in route to the heat exchanger 23E. The temperature element 23K generates an signal proportional to the temperature in conduit 23C. The signal is conveyed to the temperature indicating controller 23J. In response to this signal and a preset temperature value, the temperature indicating controller 23J sends a signal through a signal conduit (illustrated by the broken line 23L) to the control valve 23D which selectively controls the volume of heated water exiting the heat exchanger system 24A through the conduit 23I.

The condensed liquid medium formed at the heat exchanger 23E includes diluent, unreacted/under-reacted catalyst, polymer solids and unreacted monomers. This condensed liquid medium is then passed to an accumulator 24B via a conduit 22A.

It is desirable to control the amount of vapor condensed in the heat exchanger 23E and to maintain sufficient vapor pressure in the accumulator 24B. In this way, a pressure control valve 24A can maintain sufficient back pressure on the accumulator 24B. By maintaining a sufficient back pressure on the accumulator 24B, a proper operating pressure is maintained in the first flash tank 11. The pressure control valve 24A is actuated by a pressure indicating controller 24C in concert with a pressure element 24D. The pressure element 24D is in sensing communication with the accumulator 24B. The pressure element 24D generates an signal proportional to the pressure in the accumulator 24B. In response to this signal and a preset pressure value, the pressure indicating controller 24C sends a signal through a signal conduit (illustrated by the broken line 24E) to the control valve 24A which selectively controls the back pressure on the accumulator 24B.

A pump 25 is provided for conveying the condensed liquid medium from the accumulator 24B back to the polymerization zone by a conduit 26. In this way, the unreacted/under-reacted catalyst and polymer solids not removed by the cyclone 13 are returned for further polymerization to the loop reactor 1.

The polymer solids in the lower pressure second flash tank 15 are passed via a conduit 27 to a conventional dryer 28. The vapor exiting the secondary cyclone 21, after filtration in a filter unit 29, is passed by a conduit 30 to a compressor 31 and the compressed vapors are passed through a conduit 32 to a condenser 33 where vapor is condensed and the condensate is passed through conduit 34 to storage vessel 35. The condensed liquid medium in the storage vessel 35 is typically vented overhead for removal of light-end contaminants. The inert diluent can be returned to the process through a treater bed 37 to remove catalyst poisons or distilled in unit 36 for more complete removal of light-ends and then returned to the process through a treater bed.

Figure 3:
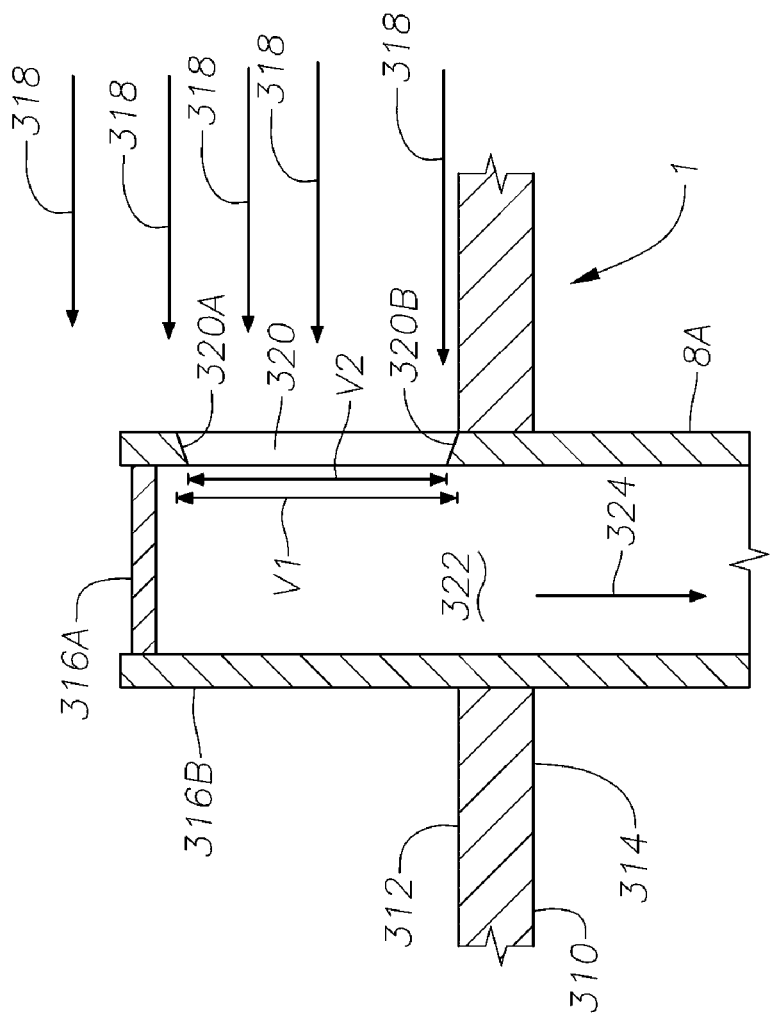
FIG. 3 is an enlarged, cross sectional view of the discharge conduit with opening extending a distance into the loop reactor and the circulating polymerization slurry.

Turning now to FIG. 3, a portion of a wall 310 of the loop reactor 1 through which the discharge conduit 8A extends is illustrated. The discharge conduit 8A may extend into the reactor at various angles. Desirably, the discharge conduit 8A extends into the loop reactor at substantially a right angle relative to the wall 310.

The wall 310 includes an inside surface 312 and an outside surface 314. The inside surface 312 supports the circulating polymerization slurry illustrated by directional arrows 318. The discharge conduit 8A has a top 316A, and a continuous side 316B. Portions of the side 316B define an opening 320. The opening 320 has a vertical opening dimensions v1 and v2 defined by walls 320A and 320B of the side 316B. Desirably, the v1 dimension is greater than the v2 dimension. The opening 320 has horizontal opening dimensions h1 and h2 (not shown). The opening 320 may be formed in any suitable shape, such as rectangular, oval, or a combination thereof. In one embodiment, the opening 320 may be conical-shaped or scooped shaped.

The opening 320 communicates with a channel 322 defined by the inside surfaces of the top 316A and the side 316B. The channel 322 conveys captured polymerization slurry, illustrated by directional arrow 324 to the discharge valve 8B (not shown).

The opening 320 is sized and positioned relative to the direction of movement of the circulating polymerization slurry 318. Desirably, the opening 320 is in a substantially facing position to the direction of the circulating polymerization slurry 318. More desirably, the opening 320 faces the direction of the circulating slurry 318. In this way, a portion of the polymerization slurry 324 containing polymer solids is removed from the circulating polymerization slurry 318 over an area from near or adjacent the inside wall 312 of the loop reactor 1 to a distance extending into the circulating polymerization slurry 318. In this way, a higher weight percentage of polymer solids may be formed within the conduit 8A than the weight percentage of polymer solids within the otherwise circulating polymerization slurry.

This weight percentage increase of polymer solids may depend upon the location of the discharge conduit 8A along the loop reactor 1, the insertion depth of the discharge conduit 8A within the loop reactor, the size and configuration of the opening 320, the orientation of the opening 320 relative to the direction of the circulating polymerization slurry, and the weight percentage of polymer solids in the circulating polymerization slurry 318. For example, between 1 to 5 weight percentage calculated increase is observed with a discharge conduit 8A having an v1 dimension of approximately 5 inches and a h1 dimension of approximately 1 inch. The discharge conduit 8A was positioned 10 ft downstream of a 90 degree bend in the loop reactor 1 in a portion of the loop reactor wall 314 adjacent the ground. The discharge conduit 8A extended approximately 5.5 inches into the circulating polymerization slurry stream. The velocity of the circulating polymerization slurry was in the range of 28 to 34 ft/sec with weight percent of polymer solids in the range of 48 to 53.

Figure 4:
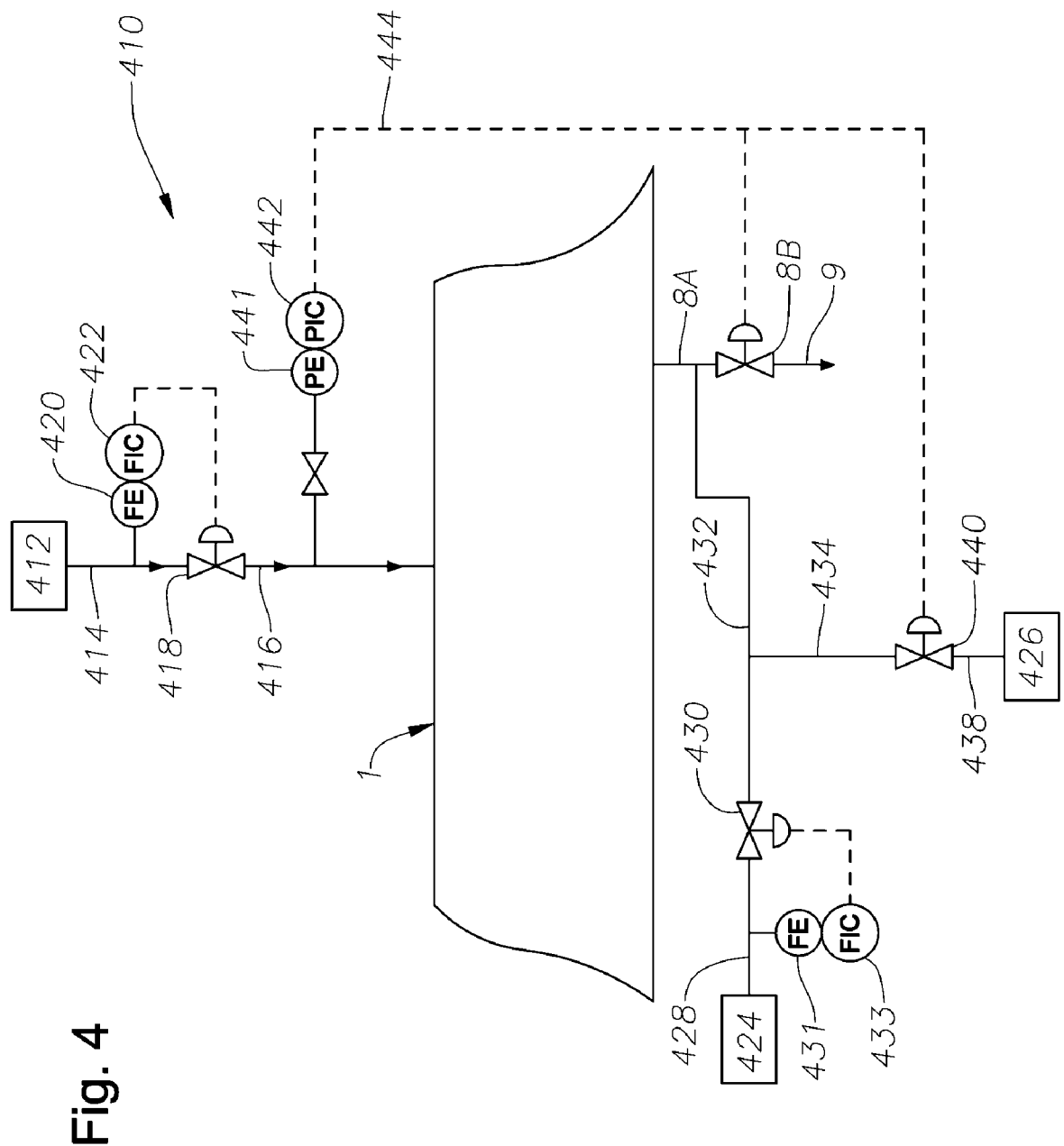
FIG. 4 is a schematic view of a pressure control system.

Turning now to FIG. 4, the pressure control system 410 is illustrated. The pressure control system 410 operates to maintain substantially uniform pressure within the loop reactor 1 by controlling the discharge of polymerization effluent from the loop reactor 1 via the discharge conduit 8A. The control system 410 also operates to prevent plugging of the discharge conduit 8A by polymer solids during pressure fluctuations within the loop reactor 1 and/or when the flow of polymerization effluent from the discharge conduit 8A to conduit 9 is interrupted and/or stopped.

The pressure control system 410 includes a first inert diluent source 412, such as isobutane, and an inert diluent conduit 414 in communication with a loop reactor conduit 416. The flow of inert diluent through the inert diluent conduit 414 to the loop reactor conduit 416 is controlled by the control valve 418 in concert with a flow element 420 and a flow indicator controller 422. The purpose of metering the flow of inert diluent from the first inert diluent source 412 to the loop reactor 1 is to prevent plugging of the conduit 416 by polymer solids. In this way, a loop reactor pressure element 441 (discussed below), in communication with the loop reactor conduit 416, may more accurately monitor the pressure in the loop reactor 1.

The pressure control system 410 further includes as second inert diluent source 424 and a third inert diluent source 426. Inert diluent, such as isobutane, from the second inert diluent source 424 flows into a conduit 428 towards a control valve 430 which is in fluid communication with a conduit 432. The control valve 430, in concert with a flow element 431 and a flow indicator controller 433, meters the flow of inert diluent from the second inert diluent source 424 into conduit 432. The conduit 432 is in fluid communication with a conduit 434 and the discharge conduit 8A, terminating in the discharge conduit 8A at a point between the loop reactor 1 and the discharge valve 8B. The purpose of metering the flow of inert diluent from the second inert diluent source 422 into the conduit 432 is to prevent plugging of the conduit 432 by polymer solids which might otherwise back flow into the conduit 432 from the discharge conduit 8A. Additionally, the flow of inert diluent from the second inert diluent source 422 also prevents plugging of the conduit 434 and the control valve 440 by polymer solids which might back flow into conduit 432 from the discharge conduit 8A.

Inert diluent from the third inert diluent source 426 flows into a conduit 438 towards a control valve 440 which is in fluid communication with conduit 434. As will be explained in greater detail below, in the event of a sufficient pressure fluctuation within the loop reactor 1, the control valve 440 operates to initiate a sufficient flow under sufficient pressure of inert diluent from the third inert diluent source 426 to purge and/or discharge polymer solids from the discharge conduit 8A into the loop reactor 1. In this instance, generally the flow of inert diluent from the third inert diluent source 426 into the conduit 432 will be greater than the flow of inert diluent from the second inert diluent source 424 into the conduit 432. For example, the flow of inert diluent from the second inert diluent source 424 to the discharge conduit 8A may be in a range of 0.5 to less than 2.0 gallons/min. The flow of inert diluent from the third inert diluent source 426 to the discharge conduit 8A may be in a range of 2.0 to 20 gallons/min.

The loop reactor pressure element 441 and a pressure indicating controller 442 perform several functions. As previously mentioned, the pressure element 441 monitors the loop reactor 1 pressure via the conduit 416. In response to this pressure, the loop reactor pressure element 441 generates an signal proportional to the pressure in conduit 416. This signal is conveyed to the pressure indicating controller 442. In response to this signal and a preset pressure value, the pressure indicating controller 442 sends a signal through a signal conduit (illustrated by the broken line 444) to the discharge valve 8B and the control valve 440.

During normal loop reactor operations, the discharge valve 8B is positioned to permit the flow of polymerization effluent from the discharge conduit 8A to conduit 9. At the same time, the control valve 440 is closed preventing the flow of inert diluent from the third inert diluent source 426 to the discharge conduit. When sufficient pressure fluctuations occur and/or when partial depressurization in the loop reactor 1 are detected by the loop reactor pressure element 441, the signal generated by the pressure indicating controller 442 causes the discharge valve 8B to close and the control valve 440 to open. By closing discharge valve 8B, thus interrupting the discharge from the loop reactor 1, pressure within the loop reactor 1 may be restored. By opening the control valve 440 and flowing sufficient volumes of inert diluent from the third inert diluent source 426 into the discharge conduit 8A under sufficient pressure, polymer solids remaining in the discharge conduit 8A between the discharge valve 8B and the loop reactor 1 may be flushed out of and/or purged from the discharge conduit 8A and into the loop reactor 1. Additionally, by maintaining a sufficient flow of inert diluent, continuous or otherwise, into and/or through the discharge conduit 8A while the discharge valve 8B is closed, the polymer solids within the loop reactor 1 are prevented from entering and/or substantially collecting in the discharge conduit 8A and/or plugging the discharge conduit 8A. Upon return of normal operations, the control valve 440 closes terminating the flow of inert diluent from the third inert diluent source 426 and the discharge valve 8B opens to resume the flow of polymerization effluent through the discharge conduit 8A into the conduit 9.

Having broadly described the present invention it is believed that the same will become even more apparent by reference to the following examples. It will be appreciated that the examples are presented solely for the purpose of illustration and should not be construed as limiting the invention.

EXAMPLES

Example 1

A typical ethylene polymerization process can be conducted at a temperature of about 215° F. and a pressure of 565 psia. An example of such a process would result in a polymerization effluent of about 83,000 pounds per hour comprising about 45,000 pounds per hour of polyethylene polymer solids and about 38,000 pounds per hour of isobutane and unreacted monomers. The continuously discharged polymerization effluent is flashed in the first flash tank at a pressure of about 240 psia and a temperature of about 180° F. to remove overhead about 35,000 pounds per hour of diluent and unreacted monomer vapors and entrained particulates. Auxiliary heat to impart an additional quantity of heat to the polymerization effluent is supplied by appropriate heating means during the transit between the discharge valve and the first flash tank. After removal of the fines, the isobutane vapor is condensed, without compression, by heat exchange at a pressure of about 240 psia and a temperature of about 135° F. The polymer slurry/solids discharging from the bottom of the first flash tank into the seal chamber form a continuous plug flow of concentrated polymer slurry/solids, which provides a pressure seal, with an l/d ratio of the plug of polymer slurry/solids of 2.5 in an 8'4" long seal chamber having an l/d ratio of 5.5 and with a cone angle of about 68° on the seal chamber exit reducer. The residence time of the continuous plug flow of concentrated polymer slurry/solids is about 16 seconds. The concentrated polymer slurry/solids are continuously discharged from the bottom of the first flash tank at a temperature of about 180° F. and a pressure of about 240 psia through a seal chamber, seal chamber exit reducer, and a second transfer conduit into a feed inlet on a second flash tank. The remaining liquid medium in the concentrated polymer slurry/solids communicated to the second flash tank is flashed at a temperature of about 175° F. and at a pressure of about 25 psia to remove about 4,300 pounds per hour of isobutane and unreacted monomers which are condensed by compression and heat exchange.

Example 2

A typical ethylene polymerization process can additionally be conducted at a temperature of about 215° F. and a pressure of 565 psia. An example of such a process would result in a polymerization effluent of about 83,000 pounds per hour comprising about 45,000 pounds per hour of polyethylene polymer solids and about 38,000 pounds per hour of isobutane and unreacted monomers. The continuously discharged polymerization effluent is flashed in the first flash tank at a pressure of about 240 psia and a temperature of about 175° F. to remove overhead about 23,000 pounds per hour of diluent and unreacted monomer vapors and entrained particulates. After removal of the fines, the isobutane vapor is condensed, without compression, by heat exchange at a pressure of about 240 psia and a temperature of about 112° F. The polymer slurry/solids discharging from the bottom of the first flash tank into the seal chamber form a continuous plug flow of concentrated polymer slurry/solids, which provides a pressure seal, with an l/d ratio of the plug of polymer slurry/solids of 2.5 in an 8'4" long seal chamber with an l/d ratio of 5.5 and with a cone angle of about 68° on the seal chamber exit reducer. The residence time of the continuous plug flow of concentrated polymer slurry/solids in the seal chamber is about 16 seconds. About 60,000 pounds per hour of concentrated polymer slurry/solids are continuously discharged from the bottom of the first flash tank at a temperature of about 175° F. and a pressure of about 240 psia through a seal chamber, seal chamber exit reducer and a second transfer conduit into a feed inlet on a second flash tank. The remaining liquid medium in the concentrated polymer slurry/solids communicated to the second flash tank is flashed at a temperature of about 125° F. and at a pressure of about 25 psia to remove about 16,000 pounds per hour of isobutane and unreacted monomer which are condensed by compression and heat exchange.

Example 3

An example of a typical ethylene polymerization process was carried out in an eight leg, 20 inch reactor with settling legs having an overall length of 833 ft and a volume of 11,500 gallons. The reactor was equipped with a single flash tank (requiring 100% compression of all diluent discharged from the reactor), a single 460-480 kilowatt circulating pump having a pump head in the range from 85 ft to 110 ft, producing a circulation rate in the range from 21,000 to 28,000 gallons per minute (gpm) and operated in a discontinuous discharge mode. The polymerization temperature and pressure in the reactor would be between about 215° F. to 218° F. and a pressure of 565 psia.

In the process of example 3, the reactor slurry density is in the range from 0.555 gm/cc to 0.565 gm/cc, a polymer production rate range from 28,000 pounds to 31,000 pounds per hour while maintaining a reactor solids concentration weight percentage in the range from 46 to 48 with a polymer residence time in the range from 0.83 to 0.92 hours. Space time yield (STY) was in the range from 2.4 to 2.7. Example 3 data and results are further illustrated in Table 1.

Example 4

Another example of a typical ethylene polymerization process illustrating high polymer solids loading was carried out in an eight leg, 20 inch reactor having an overall length of 833 ft and a volume of 11,500 gallons. The reactor in example 4 was equipped dual flash tanks, single discharge conduit, two circulating pumps in series consuming a total of between 890 and 920 kilowatts producing a total pumping head in the range from 190 ft to 240 ft, producing a circulation rate in the range from 23,000 to 30,000 gpm and operated in a continuous discharge mode. The polymerization temperature and pressure in the reactor would be between about 217° F. to 218° F. and a pressure of 565 psia.

In the process of example 4 a polymerization effluent was produced having a reactor slurry density in the range from 0.588 to 0.592 gm/cc, a polymer production rate in the range from 38,000 to 42,000 pounds per hour while maintaining a reactor solids concentration weight percentage in the range of 54 to 57 with a polymer residence time in the range of 0.68 to 0.79 hours. Space time yield (STY) was in the range of 3.3 to 3.7. Example 4 data and results are further illustrated in Table 1.

The continuously discharged polymerization effluent is flashed in the first flash tank at a pressure of about 240 psia and a temperature of about 175° F. to remove overhead about 16,000 pounds per hour of diluent and unreacted monomer vapors and entrained particulates. After removal of the fines, the isobutane vapor is condensed, without compression, by heat exchange at a pressure of about 240 psia and a temperature of about 112° F. The polymer slurry/solids discharging from the bottom of the first flash tank into the seal chamber form a continuous plug flow of concentrated polymer slurry/solids, which provides a pressure seal, with an l/d ratio of the plug of polymer slurry/solids of 2.5 in an 8'4" long seal chamber with an l/d ratio of 5.5 and with a cone angle of about 68° on the seal chamber exit reducer. The residence time of the continuous plug flow of concentrated polymer slurry/solids in the seal chamber is about 16 seconds. Concentrated polymer slurry/solids are continuously discharged from the bottom of the first flash tank at a temperature of about 175° F. and a pressure of about 240 psia through a seal chamber, seal chamber exit reducer and a second transfer conduit into a feed inlet on a second flash tank. The remaining liquid medium in the concentrated polymer slurry/solids communicated to the second flash tank is flashed at a temperature of about 125° F. and at a pressure of about 25 psia to remove about 16,000 pounds per hour of isobutane and unreacted monomer which are condensed by compression and heat exchange.

TABLE 1

ETHYLENE POLYMERIZATION DATA

| | EXAMPLE 3 | EXAMPLE 4 |
|---|---|---|
| Nominal pump(s) size, inches | 20 | 20 |
| Reactor solids concentration, wt. % | 46-48 | 54-57 |
| Polymer production rate, K lbs./hr. | 28-31 | 38-42 |
| Reactor circulation pump power, KW | 460-480 | 890-920 |
| Circulation pump head, ft. | 85-110 | 190-240 |
| Circulation rate, GPM | 21,000-28,000 | 23,000-30,000 |
| Reactor slurry density, gm/cc | 0.555-0.565 | 0.588-0.592 |
| Reactor temperature, degrees F. | 215-218 | 217-218 |
| Ethylene concentration, wt. % | 4.0-4.4 | 5.0-6.0 |
| Hexene concentration, wt. % | 0.13-0.19 | 0.13-0.19 |
| Heat transfer coefficient, btu/hr-f-ft | 215-225 | 230-245 |
| Reactor volume, gallons | 11,500 | 11,500 |
| Reactor length, ft. | 833 | 833 |
| Circulating pump head per reactor length, ft/ft | 0.100-0.132 | 0.228-0.288 |
| Catalyst productivity, lb/lb | 2,700-3,000 | 2,700-3,000 |
| Polymer residence time, hrs. | 0.83-0.92 | 0.68-0.79 |
| Space time yield, lbs/hr-gal | 2.4-2.7 | 3.3-3.7 |
| Isobutane compressed and recycled, % | 100 | 45-60 |

Discussion

In view of the above description and examples, several observations relative to the apparatus and process can be made.

It has been observed that by increasing the head and flow capability of the loop reactor circulating pump(s), higher weight percent solids can be circulated in the reactor. It has also been observed that attaining the necessary head and flow from one pump is increasingly difficult as percent solids are increased above 45 weight percent and/or reactor length is increased. Therefore, the use of two pumps in series allows a doubling of pumping head capability and a resulting percent solids increase. Increased weight percent solids in the loop reactor increases catalyst residence time, which for chrome oxide and Ziegler-Natta catalysts, increases catalyst productivity. One can choose to take advantage of higher percent solids and longer residence time by keeping production rate constant at reduced catalyst feed rate and improve the catalyst yield. Another alternative is to maintain catalyst feed rate constant and increase the reactor throughput and therefor increase STY at nearly constant catalyst productivity. Higher solids also increases the weight percent solids removed from the reactor which reduces isobutane processing cost in recycle equipment. Desirably, the higher solids are removed continuously. Continuous discharge may occur through a single point discharge line.

In a loop reactor, it is not always possible to locate the continuous discharge line in an optimal location to take advantage of centrifugal force to increase the weight percent solids and therefore reduce the amount of isobutane entrained with the polymer solids. It has been observed that a specifically designed pipe as illustrated in FIG. 3 inserted into the loop reactor can increase weight percent solids removed from the reactor. This pipe insert will function in any section of the loop reactor and in a straight section will increase the weight percent solids to that equal to that in a location which takes advantage of centrifugal force to concentrate solids.

With the development of high weight percent solids circulation capability in the loop reactor and two-stage flash, the need to concentrate solids in the reactor discharge is reduced compared to the conventional loop reactor operations having low solids circulation, single-stage flash, continuous discharge line, and continuous discharge or otherwise. Therefore, the conventional loop reactor settling legs, which are designed to maximize polymer solids concentration prior to discharge, can be replaced with a continuous discharge line, which simplifies the system mechanically, reduces capital cost, improves safety, reduces maintenance and improves reactor control. Settling legs require routine maintenance due to their plugging tendency and can form material which plugs downstream polymer handling equipment. Maximum loop reactor ethylene concentration is limited by settling legs due to the tendency for polymer to grow in the legs at elevated ethylene concentrations between discharges and therefore plug the leg. Continuous discharge eliminates this tendency. Another advantage of continuous discharge is better response to a sudden drop in reactor pressure, which can happen if ethylene flow is quickly reduced. Under this condition, settling legs will stop discharging and can plug with polymer within minutes A development which would increases efficiency of the two-stage flash system is the continuous flash line heater. The heater would vaporize up to 100% of the diluent discharged from the reactor with the polymer which would allow greater recovery of the diluent by the intermediate pressure condenser. Diluent recovery through the first flash tank would reduce utility and capital cost. Conventional low pressure single-stage diluent recovery systems include compression, distillation and treatment which have high capital and operating cost. The flash line heater would increase the temperature of the polymer in the downstream dryer system and would create the potential for lower volatile levels in the final product, which would lower variable cost, improves safety and aids attainment of environmental standards.

The first flash tank provides an intermediate pressure flash step which allows for simple condensation of diluent and return to the reactor. The flash line heater would be capable of supplying sufficient heat to vaporize up to 100% of the diluent in the first flash tank.

Diluent vapor and unreacted/under reacted catalyst/polymer fines go overhead from the flash tank to the cyclone. The bulk of the polymer goes out the bottom of the first flash tank through the seal chamber to the second flash tank.

Connected to the bottom of the first flash tank is the seal chamber which provides for a low residence time plug flow area to control polymer level and maintain pressure in the first flash tank. The seal chamber is designed to accommodate a range of polymer forms from concentrated slurry to dry polymer.

The overhead stream from the first flash tank is received by the cyclone, which removes most of the polymer fines and returns them to the bulk of the polymer flow in the second flash tank through a two valve system which allows the fines to accumulate between the valves, then discharge through the bottom valve while maintaining pressure in the first flash system. The overhead stream from the cyclone contains some unreacted/under reacted catalyst and polymer fines. These particles are carried with the diluent vapor to the condenser, entrained with the liquid diluent after condensation, collected in the accumulator and returned to the reactor in the diluent. The condensation and accumulator systems are designed and operated to accommodate fines.

The condenser provides for low variable and capital cost liquefaction of the diluent removed from the rector with the polymer via the first flash tank. Conventional single flash tank systems flash the polymerization effluent to the just above ambient pressure, which requires compression to liquefy the diluent prior to recycle to the loop reactor. An intermediate pressure flash provides for condensation with a commonly available cooling medium, such as Plant cooling water. The condenser system is flushed with diluent and designed to accommodate a level of fines without accumulation or plugging. The condenser is cooled by a tempered water system which controls the condensation temperature to achieve the proper vapor pressure in the accumulator to allow efficient pressure control by the pressure control valve on the accumulator vent. The condenser tempered water system is a pump-around loop of cooling water, the temperature of which is controlled by metering in fresh cooling water as needed.

The accumulator receives the condensed diluent and catalyst/polymer fines and pumps the mixture back to the loop reactor based on level control in the accumulator. The accumulator has a bottom shape designed to accommodate fines. A vent on the accumulator purges the accumulated diluent of light-ends/non-condensables and controls pressure on the first flash system.

The second flash tank, operating just above ambient pressure, receives polymer from the first flash tank seal chamber. Complete vaporization, if not already accomplished in the first flash tank, will occur in the second flash tank. Polymer leaves the bottom of the second flash tank to the dryer system. The flash-line heater would increase the temperature of the polymer which allows the dryer system to remove residual volatiles more efficiently and effectively. The overhead of the second flash tank will be diluent vapor not recovered in the first flash system and will be filtered and compressed for return to the loop reactor.

While the present invention has been described and illustrated by reference to particular embodiments, it will be appreciated by those of ordinary skill in the art that the invention lends itself to many different variations not illustrated herein. For these reasons, then, reference should be made solely to the appended claims for purposes of determining the true scope of the present invention.

Although the dependant claims have single dependencies in accordance with U.S. patent practice, each of the features in any of the dependant claims can be combined with each of the features of other dependant claims or the main claim.

We claim:

1. A loop reactor comprising: at least 8 vertical legs; at least two discharge conduits on opposite sides of at least one loop reactor vertical plane of symmetry; and at least two feed inlets located on opposite sides of at least one loop reactor vertical plane of symmetry.

2. The loop reactor of claim 1, comprising at least one discharge conduit and one feed inlet on one side of at least one loop reactor vertical plane of symmetry and at least one discharge conduit and one feed inlet on the other side of the same plane of symmetry.

3. The loop reactor of claim 1, further comprising at least two catalyst inlets located on opposite sides of the at least one loop reactor vertical plane of symmetry.

4. The loop reactor of claim 1, further comprising at least two circulators located on opposite sides of the at least one loop reactor vertical plane of symmetry.

5. The loop reactor of claim 3, further comprising at least two circulators located on opposite sides of the at least one loop reactor vertical plane of symmetry.

6. The loop reactor of claim 2, further comprising at least one catalyst inlet and at least one circulator on one side of the same plane of symmetry and at least one catalyst inlet and at least one circulator on the other side of the same plane of symmetry.

7. A loop reactor system comprising a) at least 8 parallel legs; and b) at least 8 connector fittings, each said fitting adapted to connecting a pair of said parallel legs, such that assembly of said parallel legs and said connector fittings forms a single continuous closed loop; wherein at least 2 of said connector fittings are adapted to connecting alternate pairs of parallel legs, such that assembly of said parallel legs and said connector fittings forms at least 2 continuous closed loops.

8. The loop reactor of claim 7, wherein the at least 2 continuous closed loops are in series.

9. The loop reactor of claim 7, wherein the at least 2 continuous closed loops each has at least one feed inlet, at least one catalyst inlet, at least one circulator, and at least one discharge conduit.

* * * * *